United States Patent [19]
Dahl

[11] Patent Number: 5,221,928
[45] Date of Patent: Jun. 22, 1993

[54] METHOD AND APPARATUS FOR ACCURATE, HIGH SPEED PULSE-ECHO MEASUREMENT CALIBRATION

[75] Inventor: Randy L. Dahl, Mesa, Ariz.

[73] Assignee: Motorola, Inc., Schaumburg, Ill.

[21] Appl. No.: 897,633

[22] Filed: Jun. 12, 1992

[51] Int. Cl.$^5$ ............................ G01S 7/34; G01S 7/40
[52] U.S. Cl. ...................................... 342/205; 342/91; 342/92; 342/174
[58] Field of Search .................... 342/205, 91, 92, 174, 342/195, 197

[56] References Cited

U.S. PATENT DOCUMENTS

| | | | |
|---|---|---|---|
| 3,176,293 | 3/1965 | Nolen et al. | 342/91 |
| 3,659,290 | 4/1972 | Bourque | 342/136 |
| 4,169,263 | 9/1979 | Hooker, Jr. | 342/92 |
| 4,415,897 | 11/1983 | Kennedy | 342/205 |
| 4,435,707 | 3/1984 | Clark | 342/26 |
| 4,994,811 | 2/1991 | Moreira | 342/205 |
| 5,105,195 | 4/1992 | Conrad | 342/174 |
| 5,160,933 | 11/1992 | Hager | 342/174 |

Primary Examiner—John B. Sotomayor
Attorney, Agent, or Firm—Frederick M. Fliegel; Robert M. Handy

[57] ABSTRACT

An apparatus comprises a signal input and a sampler and analog-to-digital (A/D) converter coupled to the signal input. The sampler and A/D converter forms a digital pre-look signal from an input signal. The apparatus further comprises a digital memory coupled to the sampler and A/D converter. The digital memory stores sensitivity time control (STC) data and provides specific STC data in response to the digital pre-look signal. The apparatus further comprises a digital-to-analog converter coupled to the digital memory. The digital-to-analog converter converts the specific digital STC data to a first analog STC signal. The apparatus also includes a first comparator coupled to the signal input and to the digital-to-analog converter. The first comparator has an input for receiving the first analog STC signal. The first comparator compares a present input signal to the first analog STC signal to provide a detection signal.

21 Claims, 17 Drawing Sheets

710

METHOD AND APPARATUS FOR ACCURATE, HIGH SPEED PULSE-ECHO MEASUREMENT CALIBRATION

FIELD OF THE INVENTION

This invention relates in general to the field of rapid calibration for time-dependent measurements, in particular to calibration for remote detection apparatus such as, for example, radar, sonar and lidar apparatus.

BACKGROUND OF THE INVENTION

Radio detection and ranging or "radar", sound", navigation and ranging or "sonar" and light detection and ranging or "lidar" (also known as "ladar") are important for many navigation, fuzing and collision avoidance applications. These are used for sensing the location and velocity of either a single object or a plurality of objects simultaneously, independent of conditions affecting detection. An increasingly important application of such sensing devices is in avoidance of collisions between, for example, land based vehicles such as automobiles, motorcycles, trucks and between sea based vehicles and further between airplanes, helicopters and other flying vehicles, including avoidance of fixed or moving objects.

Similar apparatus are employed for time domain reflectometry, seismic mapping, ultrasonic imaging for medical and other nondestructive testing and evaluation, as well as other pulse-echo or signal-echo apparatus.

Such sensing apparatus operate by generating and transmitting an interrogation signal and receiving an echo thereof. The delay between transmission and subsequent reception of a reflected component or echo of the transmitted signal is determined. This delay measures distances or ranges between the transmitter, the remote object and the receiver. Many characteristics (e.g., size, albedo, shape) of the remote object may be determined from detailed comparisons between transmitted and received signals.

An object which is being echo-ranged provides a large return signal if close to the echo-ranging transmitter and a small return when far away. To a first approximation the amplitude of the return echo signal varies inversely as a power of the distance between the transmitter/receiver and the target. Since the outgoing and returning pulses typically propagate with constant velocity, the return echo amplitude for targets at various distances also decreases approximately inversely as the square of time.

This relationship is illustrated by curve 52 in FIG. 1. The abscissa and ordinate of FIG. 1 are calibrated in arbitrary units, with times $T_0$ and $T_1$ corresponding to the initiation of and the duration of measurement interval $T_1$, respectively, during which measurement occurs.

Times $T_B$ and $T_E$ mark the beginning and end, respectively, of a measurement epoch. A measurement epoch comprises an initial period $T_{CAL}$ and a subsequent measurement period $T_1$. During initial period $T_{CAL}$ assessment of and calibration for measurement Conditions may occur and the measurement pulse is launched. Other related events, such as receiver blanking (temporarily disabling the receiver to avoid receiver overloading by energy from measurement pulse transmission), also occur during this interval. During measurement period $T_1$, the receiver is enabled and received signals are processed. Measurement period $T_1$ concludes at time $T_E$, when a subsequent measurement epoch may begin.

A commonly used technique in echo-ranging is dynamically adjusting the input attenuation (1/gain) and/or the detection threshold of the echo receiver to correspond to curve 52 of FIG. 1. In other words, if the object is close, the echo returns quickly and is large and the receiver attenuation or detection threshold should be high (gain can be low), and if the object is distant, the echo returns later and is weaker and the receiver attenuation or detection threshold should be low (gain must be high), as shown by curve 52. Ultimately, the received signal is extinguished when the reflecting object is sufficiently distant.

If the input attenuation (1/gain) and/or the detection threshold of the echo receiver is varied according to curve 52, one obtains a constant probability of target detection independent of distance. If the return signal lies above curve 52, it is detected, and if it lies below curve 52 it is not detected. Such a time varying detection threshold is referred to as an analog sensitivity time control (STC) curve or signal and is typically used for adjusting the receiver input sensitivity with time. Curve 52 represents an analog STC curve or signal and line 54 is a digital approximation of curve 52.

It is difficult in practice to accurately realize analog STC functions as exemplified by curve 52 by conventional analog techniques, such as R-C or R-L-C networks. Further, analog radio frequency techniques for providing such signals are inherently slow and become complex when it is necessary to accommodate arbitrary changes in the desired receiver gain or threshold by electronic methods. Often digital approximations such as 54 are made to arbitrary analog STC curves such as 52.

Examples of such analog radio frequency techniques for radar applications are discussed in U.S. Pat. No. 4,994,811, entitled "Sensitivity Time Control Device", by J. Moreira and in U.S. Pat. No. 4,415,897, entitled "Precision Control of RF Attenuators for STC Applications", by H. Kennedy, wherein use is made of digital-to-analog converters for controlling variable radio frequency attenuators. These radio frequency attenuators generate approximations to the desired STC curves in response to control signals.

Lidar apparatus does not require radio frequency signal processing because light pulses are transmitted and received. Signals resulting from detected light signals are processed at baseband frequencies. Conditions affecting propagation of transmitted and reflected light pulses complicate calibration of lidar apparatus.

FIG. 2 is a histogram comparing examples of expected lidar return signal levels from a target (hatched) and background signal levels from the ambient and/or noise (plain), both in arbitrary units, for three different situations. Return signal level 70 and background signal level 75 are representative of echo return signals under clear air conditions. Return signal level 80 and background signal level 85 are typical of what is observed under aerosol conditions, i.e., fine mists or thin clouds, while return signal level 90 and background signal level 95 represent what is often observed with bright background conditions, e.g., bright clouds.

The values represented by right hand (plain) histograms 75, 85 and 95 in the three data pairs of FIG. 2 show representative examples of the background signal levels typical for clear air, aerosol and bright background conditions, respectively. Ambient background signal levels for clear air 75 and aerosol 85 measurement conditions are approximately the same, while bright background ambient signal level 95 is typically much higher.

Comparison of left hand (hatched) histograms 70, 80 and 90 of the data pairs of FIG. 2 shows that the return signal levels are expected to be comparable for clear air 70 and bright background 90 scenarios, while return signal level 80 under aerosol conditions can be expected to be reduced appreciably. These different circumstances require different criteria for STC curves in order to optimally detect a target return signal in the presence of an ambient background signal.

What are needed are improved means and methods for generating precise signals to realize STC curves for echo receivers which automatically account for varying ambient conditions over very short measurement intervals, corresponding to ranges of a few tens or hundreds of meters or less.

SUMMARY OF THE INVENTION

An apparatus for time-based measurements comprises, in general form, a receiver for receiving an input signal and digital control and a timing generator providing control and clocking signals. The apparatus further includes an input signal storage device which stores the input signal in response to signals from the digital control and timing generator. The input signal storage device provides a digitized calibration signal. A sensitivity time control (STC) generator provides an analog calibration signal in response to the digitized calibration signal. A comparator is coupled to the input signal and to the STC generator. The comparator compares the input signal to the analog calibration signal and provides an output comparison signal.

In a preferred embodiment, there is provided an apparatus for high speed range measurement, The apparatus comprises signal receiver for providing one or more input signals. Each of the one or more input signals has a bandwidth $B_n$. The apparatus further comprises a digital control and timing generator for providing control signals and clocking signals, and a sampler and analog-to-digital converter, which is coupled to the digital control and timing generator. The sampler and analog-to-digital converter stores at least one of the one or more input signals in response to control signals from the digital control and timing generator. The sampler and analog-to-digital converter provides a digitized calibration signal. The apparatus further comprises a sensitivity time control generator for providing an analog calibration signal. The sensitivity time control generator is coupled to the sampler and analog-to-digital converter.

The apparatus also includes one or more comparators coupled to the signal receiver and has inputs, each having an attenuator having an attenuation $G_n$ coupled to the analog calibration signal. Each of the one or more comparators compares one of the one or more input signals to the analog calibration signal to provide a detection signal to a comparison signal output. Each of the one or more comparators and each of the one or more input signals are coupled to the sensitivity time control generator to provide a bandwidth-gain ratio for each of the one or more comparators substantially in accordance with: $(B_n)^{0.5}/G_n = K$, wherein K has a constant value in the range of one to ten billion and K has dimensions of square root Hertz.

The present invention further provides a method to process signals for pulse-echo ranging measurement, which method comprises the steps of receiving an input signal, providing analog calibration data from digital calibration data contained in a high speed digital memory and providing addressing to the high speed digital memory from a time/range gate counter to access subsequent digital calibration data contained in the high speed digital memory. The method further includes the steps of comparing the analog calibration data to the input signal to provide a comparison signal and transmitting the comparison signal to the pulse-echo ranging measurement equipment.

The method desirably but not necessarily includes the step of loading a high speed digital memory with digital calibration data from a non-volatile memory when a control signal is provided by digital control and timing generator. The method desirably but not necessarily includes the steps of sampling the input signal to form an analog calibration estimate and storing the analog calibration estimate.

The method further desirably but not necessarily includes the steps of forming a digital calibration estimate from the stored analog calibration estimate, and loading the digital calibration estimate into the high speed digital memory to select digital calibration data. The method desirably but not necessarily includes the step of storing the comparison signal and the corresponding time/range gate counter values to determine the relative duration of the comparison signal.

BRIEF DESCRIPTION OF THE DRAWINGS

A more complete understanding of the present invention may be derived by referring to the detailed description and claims when considered in connection with the figures, wherein like reference numbers refer to similar items throughout the figures, and:

DETAILED DESCRIPTION OF THE DRAWINGS

Figure 6:
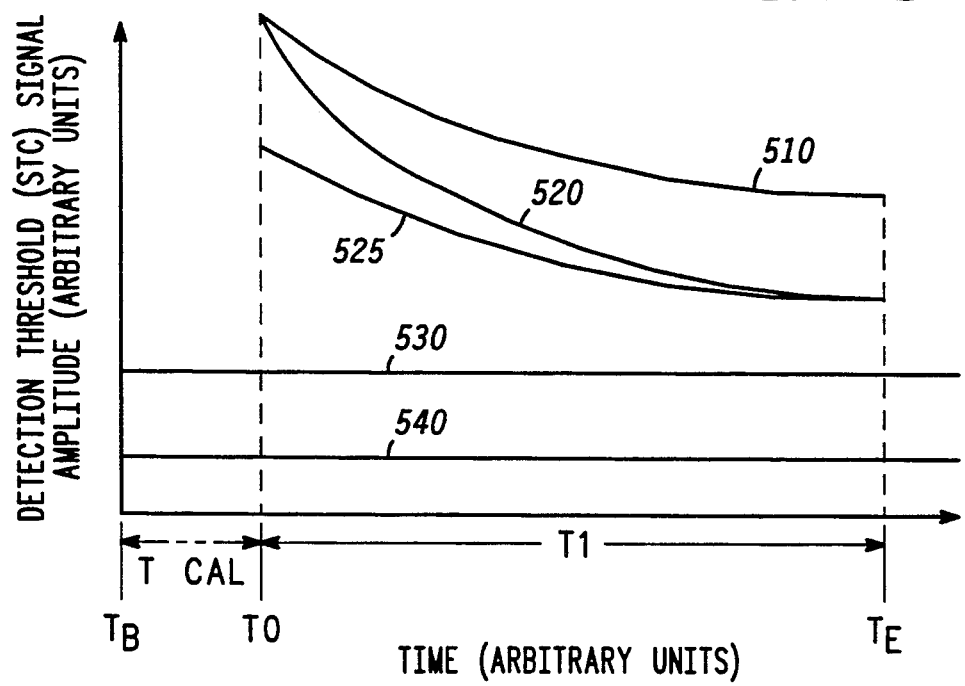
FIG. 6 is a graph of representative simplified examples of sensitivity time control curves and background noise for the examples of FIG. 2 in accordance with the present invention.

Section A (see FIGS. 3 and 4) describes a circuit topology for precise assessment of echo ranging data for clear air and bright background conditions according to the present invention. Section B describes a method (see FIG. 5) for rapidly providing STC information and processing echo signals. FIG. 6 depicts typical signals associated with the circuits of FIGS. 3 and 4 and the method of FIG. 5. Section C describes examples of the circuits of FIGS. 3 and 4 in more detail in connection with FIGS. 7 through 9 and 12 through 16. Timing diagrams (see FIGS. 10 and 11) and measured results are described in connection with FIG. 17.

Section D describes signals (see FIG. 18) and a circuit (see FIG. 19) for detecting the presence of an aerosol and for detecting a target within an aerosol. Section E describes a method (see FIG. 20) for determining the presence of aerosol conditions and for detecting targets within aerosols. Section F presents calculated system performance data (see FIG. 21) under aerosol conditions.

A. PULSE-ECHO CALIBRATION CIRCUIT

Figure 3:
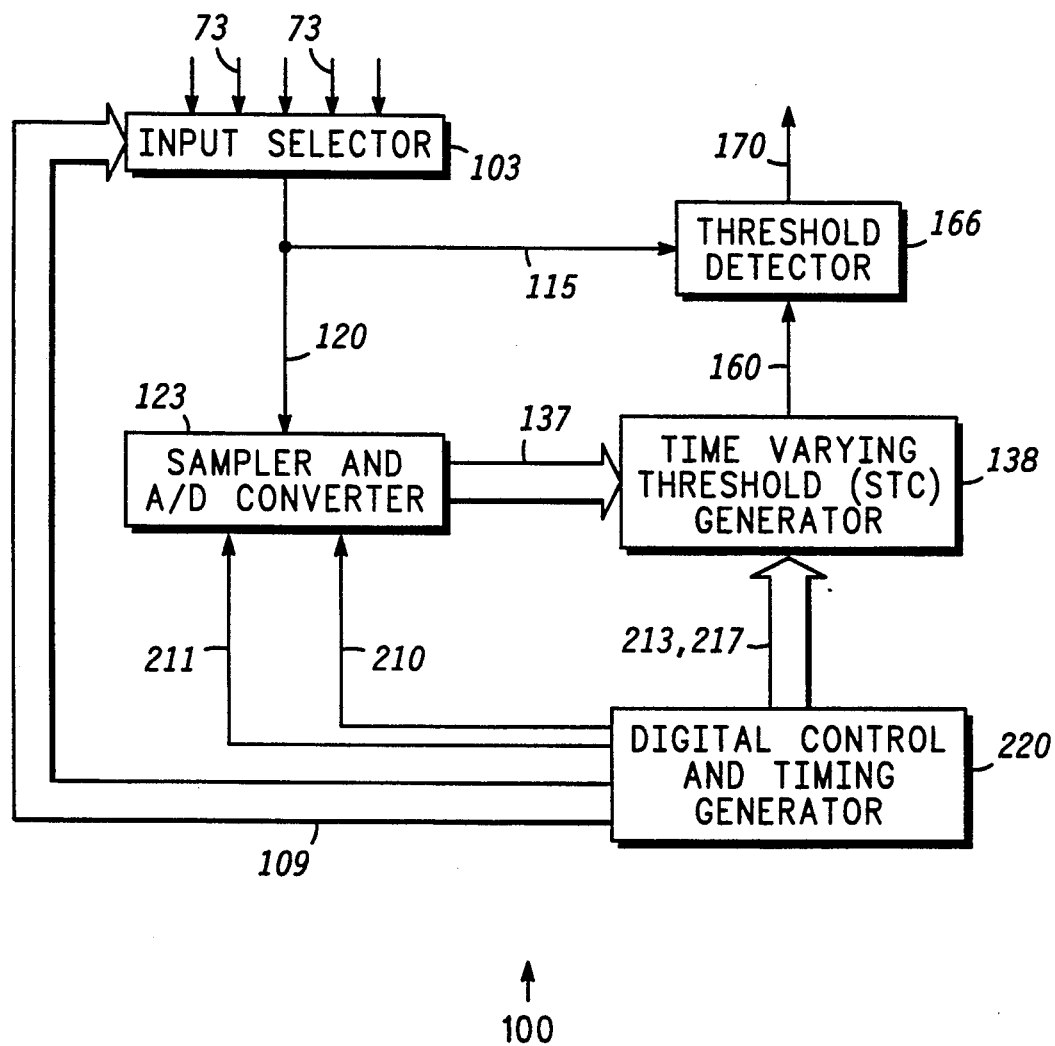
FIG. 3 is a highly simplified block diagram of a calibration or measuring apparatus.

FIG. 3 is a highly simplified block diagram of calibration or measuring apparatus 100. Calibration apparatus 100 comprises a plurality of inputs 73, input selector 103, sampler and analog-to-digital (A/D) converter 123, digital busses 109 and 137, time varying threshold (STC) generator 138, threshold detector 166, digital control and timing generator 220, digital buss 213 and interconnections 115, 120, 160, 170, 210, 211 and 217.

Inputs 73 are coupled to input selector 103, which selects one of inputs 73 in response to control signals coupled via digital buss 109 from digital control and timing generator 220. The selected one of inputs 73 is coupled via leads 115 and 120 to threshold detector 166 and sampler and A/D converter 123, respectively. Digital control and timing generator 220 triggers sampler and A/D converter 123 via signals coupled by leads 210 and 211, causing sampler and A/D converter 123 to sample the input signal on lead 120 for a predetermined time period and to store the resultant input signal sample.

The stored input signal sample is then converted to a digital value which is output to STC generator 138 via digital buss 137. These selecting and triggering events occur during pre-calibration interval $T_{CAL}$ prior to time $T_0$ of FIG. 1. Each level (horizontal) section of curve 54 corresponds to a different digital word within STC generator 138.

Figure 1:
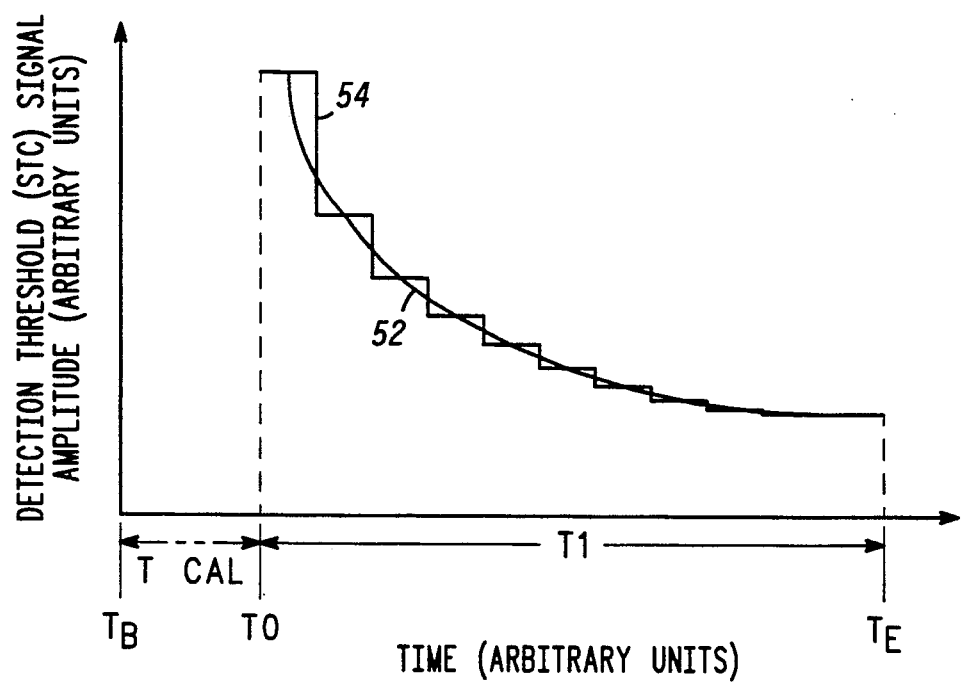
FIG. 1 shows an example of an idealized analog sensitivity time control curve and a digital approximation thereto.

Just prior to time $T_0$, a pulse signal is transmitted and digital timing and control generator 220 initiates measurement interval $T_1$ of FIG. 1, triggering STC generator 138 via lead 214 and digital busses 213 and 217 to select calibration data in response to the digital value coupled to STC generator 138 via digital buss 137. During measurement interval $T_1$, STC generator 138 provides an analog STC threshold to threshold detector 166 via lead 160.

Threshold detector 166 compares the selected input signal on lead 115 to the analog STC threshold on lead 160 and provides an output signal via lead 170. The output signal on lead 170 indicates whether the input signal on lead 115 or the analog STC threshold on lead 160 is greater, thus indicating the presence or absence of an object or objects providing a reflection or echo of the transmitted pulse.

Figure 4:
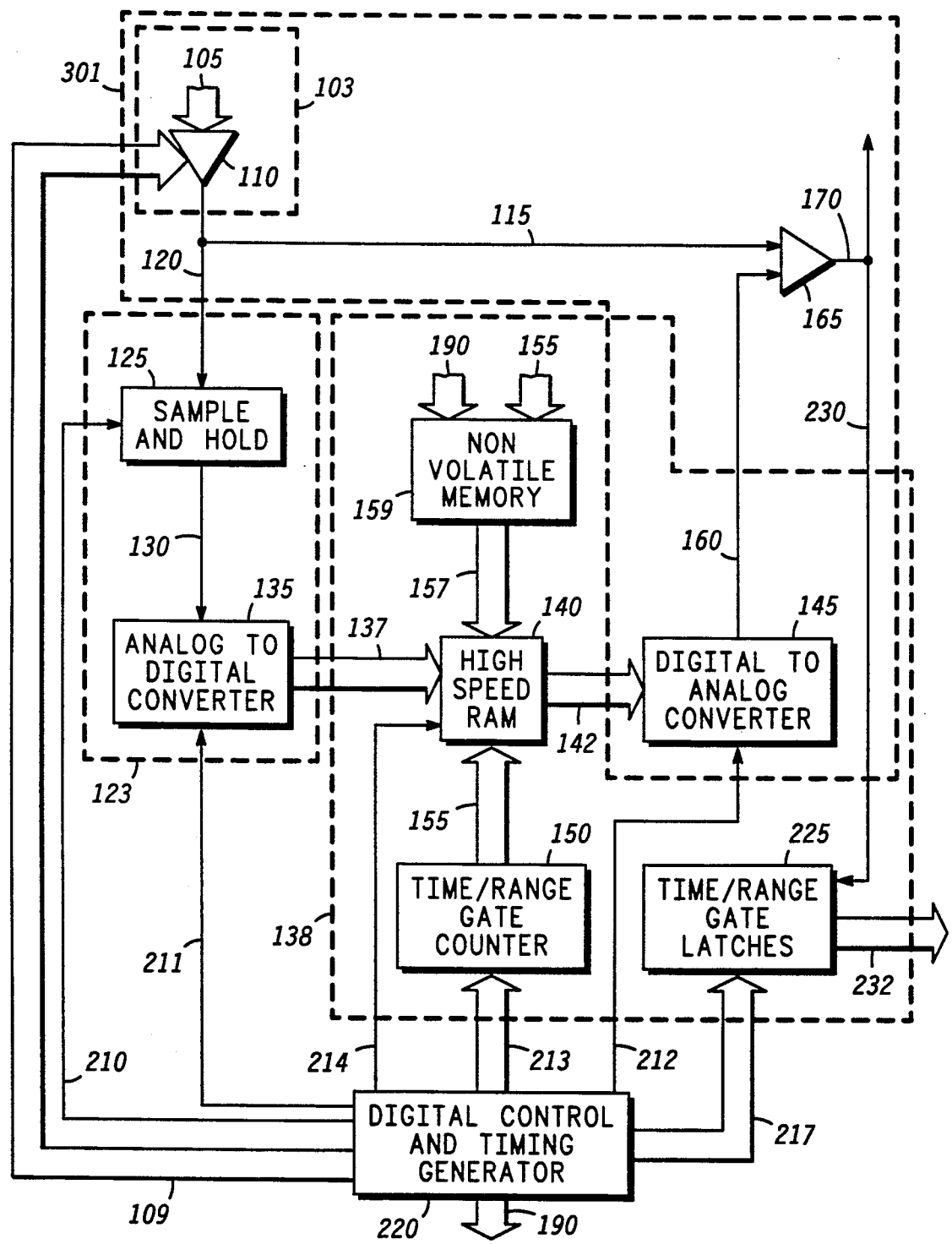
FIG. 4 is a simplified block diagram of a calibration or measuring apparatus in accordance with the present invention.

FIG. 4 is a simplified block diagram of calibration or measuring apparatus 100 in accordance with the present invention. An explanation of the interconnection of the elements shown in FIG. 4 is followed by a discussion of the operation of measuring apparatus 100.

Measuring apparatus 100 comprises input selector 103, leads 115 and 120, sampler and A/D converter 123 and digital busses 109 and 137. Measuring apparatus 100 further comprises digital control and timing generator 220 coupled to digital busses 109, 213 and 217 and leads 210, 211, STC generator 138 coupled to leads 160 and 230 and buss 232, comparator 165 and comparison output 170. Comparator 165 is one realization of and corresponds to threshold detector 166 of FIG. 3.

Input selector 103 optionally comprises multiple analog inputs 105 (corresponding, for example, to a plurality of antennae or detectors such as photodetectors and also corresponding to inputs 73 of FIG. 3) and analog multiplexing switch 110. The terms "analog inputs", "analog input bus", "analog bus" and "multiple analog inputs" are used interchangeably herein to represent analog inputs 105.

Input selector 103 is coupled to comparator 165 by lead 115, to sampler and A/D converter 123 by lead 120 and to digital control and timing generator 220 by digital buss 109.

Sampler and A/D converter 123 functions as a signal store to store a pre-look calibration signal and conveniently comprises sample and hold 125 coupled by lead 130 to analog-to-digital converter 135. Sampler and A/D converter 123 is coupled to input selector 103 by lead 120, to digital control and timing generator 220 by leads 210 and 211.

Leads 210 and 211 are coupled to sample and hold 125 and to analog-to-digital converter 135, respectively. Analog-to-digital converter 135 is also coupled to STC generator 138 by digital buss 137.

STC generator 138 conveniently comprises high speed digital memory 140 (e.g., an addressable memory such as a random access memory or RAM, or, alternatively a high speed read only memory or ROM), digital buss 142, digital-to-analog converter 145, time/range gate counter 150, digital busses 155, 190, 213, 217 and 232, non-volatile memory 159 and digital buss 157, time/range gate latches 225 and leads 160 and 230. Digital buss 137 couples signals to STC generator 138 from sampler and A/D converter 123. The terms "digital-to-analog converter" and "high speed digital-to-analog converter" are used interchangeably herein to refer to digital-to-analog converter 145.

Non-volatile memory 159 is coupled to high speed digital memory 140 by digital buss 157. Digital buss 155 couples time/range gate counter 150 to high speed digital memory 140 and non-volatile memory 159. Non-volatile memory 159 is also coupled to digital control and timing generator 220 via digital buss 190. High speed digital memory 140 is coupled to sampler and A/D converter 123 by digital buss 137, to digital-to-analog converter 145 by digital buss 142 and to digital control and timing generator by lead 214.

Time/range gate counter 150 is coupled to digital timing and control generator 220 by digital buss 213. Digital timing and control generator 220 is coupled to time/range gate latches 225 by digital buss 217. Time/range gate latches 225 are coupled to lead 170 by lead 230 and to external circuitry (not shown) by digital buss 232. Digital-to-analog converter 145 is coupled to comparator 165 by lead 160 and to digital timing and control generator 220 by lead 212. High speed RAM 140 is coupled to digital timing and control generator 220 by lead 214.

Operation of apparatus 100 comprises two distinct phases. The first of these phases occurs in response to either a reset command or initiation of electrical power to apparatus 100. This phase is referred to as the preloading phase. The second phase comprises a series of range measurements. The first phase must occur at least once in order for the second phase to occur. The second phase is repetitive and comprises a series of measurement epochs, corresponding to the interval bounded by times $T_B$ and $T_E$ of FIG. 1.

During the preload phase, digital address data from time/range gate counter 150 are coupled to non-volatile memory 159 and to high speed digital memory 140 via digital buss 155. These digital address data start from a predetermined address value and sequentially increment to a second predetermined address value. STC threshold information stored in non-volatile memory 159 are downloaded into high speed digital memory 140 via digital buss 157 in response to signals coupled to non-volatile memory 159 via digital buss 190. At the conclusion of the preload phase, signal processing operation may begin.

In operation, analog input signals (e.g., return echo signals) are present on analog inputs 105. The analog input signals may correspond to a plurality of photodetectors which are each in turn selected by input selector 103, in the example of lidar apparatus. One input signal (from a particular photodetector, for example) is selected by analog multiplexing switch 110 in response to signals from digital control and timing generator 220 communicated via digital buss 109. The selected input signal is coupled to sample and hold 125 and comparator 165 by leads 115 and 120, respectively.

During a first portion or calibration interval of a measurement (i.e., during time $T_{CAL}$, FIG. 1), sampler and A/D converter 123 is enabled to measure and store a signal representing, for example, the peak input signal noise level on lead 120 in sample and hold 125 in response to signals coupled via line 210 from digital control and timing generator 220. At time $T_0$, A/D converter 135 of sampler and A/D converter 123 converts the stored analog signal on lead 130 into a digital signal which is output on digital buss 137 in response to signals coupled via line 211 from digital control and timing generator 220. The signal from digital buss 137 is converted to a time varying analog calibration (STC) threshold signal by STC generator 138 and the analog calibration signal is coupled to comparator 165 via lead 160.

To provide analog STC threshold information, high speed digital memory 140 selects digital data stored therein in accordance with the signal present on digital buss 137. The digital signal present on digital buss 137 is latched and used as address data for high speed memory 140 in response to control signals coupled via lead 214 from digital control and timing generator 220. Analog-to-digital converter 135 converts the analog signals on lead 130 to a digital value which is output on digital buss 137. This digital value on digital buss 137 is conveniently used, for example, as the upper address bits for high speed digital memory 140 in order to select calibration data appropriate to the background signal strength conditions determined from the input signal amplitude measured by sample and hold 125 during calibration interval $T_{CAL}$.

High speed digital memory 140 outputs a stream of selected data on digital buss 142 in response to addressing information coupled from time/range gate counter 150 via digital buss 155. Time/range gate counter 150 counts incrementally to produce a changing count, in response to clocking signals from digital control and timing generator 220 delivered via digital buss 213.

The changing count from time/range gate counter 150 is passed to high speed digital memory 140 via digital buss 155. The changing count from time/range gate counter 150 may be used as lower address bits for high speed digital memory 140 to select sequential STC information describing threshold levels during interval $T_1$ of FIG. 1. High speed digital memory 140 thus provides a digital data stream comprising a series of digital words to digital-to-analog converter 145 via digital buss 142.

Digital-to-analog converter 145 converts this digital data stream into a time-varying piece-wise-linear analog signal (e.g., trace 54 of FIG. 1; each of the digital words corresponds to a particular horizontal section of curve 54). The piece-wise-linear analog signal from digital-to-analog converter 145 is an analog detection threshold signal (e.g., an STC threshold signal) supplied to comparator 165 via lead 160.

Digital-to-analog converter 145 produces an analog calibration output signal, or analog pre-look signal, on lead 160 in response to digital signals present on digital buss 142. Comparator 165 compares the analog threshold signal on lead 160 to the input signal on lead 115 and produces a comparison output signal on leads 170 and 230. The comparison output signal on leads 170 and 230 switches between digital states in response to the relative magnitudes of the input signal on lead 115 and the analog calibration output signal on lead 160.

For example, if the input signal on lead 115 exceeds the calibration signal on lead 160, then comparator 165 produces an output signal, indicating that a return echo greater than the STC threshold signal is present. If the input signal on lead 115 is less than the calibration signal on lead 160, comparator 165 produces no output signal, indicating that a return echo signal greater than the STC threshold signal is not present.

Time/range gate latches 225 provide an indication of the duration of the target detection signal by comparing transitions in the comparison output signal on lead 230 to a count analogous to that of time/range gate counter 150. In radar, lidar or sonar applications, the duration of a target detection signal provides information regarding target size.

High speed digital memory 140 provides calibration data in accordance with the digital input from time/range gate counter 150, allowing the detection threshold for comparator 165 to change during the measurement period and also allowing differing detection thresholds to be established for different measurement periods corresponding to varying measurement conditions having associated background signal strengths.

Data from sampler and A/D converter 123 thus may indicate different background signal levels at different times. This information is used to select specific stored calibration data from high speed digital memory 140 accordingly.

In an alternative embodiment, data are stored in high speed digital memory 140 which comprises a read only memory or ROM. In this embodiment, operation of apparatus 100 comprises a single phase. The first of the preceding embodiment's phases (the preloading phase) is no longer required. The remaining phase corresponds to the second phase of the preceding embodiment and comprises a series of range measurements. The first phase no longer need occur at least once in order for range measurements to occur; these comprise a series of measurement epochs, corresponding to the interval bounded by times $T_B$ and $T_E$ of FIG. 1. In this second embodiment, STC generator 138 of FIG. 3 no longer requires non-volatile memory 159 (FIG. 4).

B. METHOD

Figure 5:
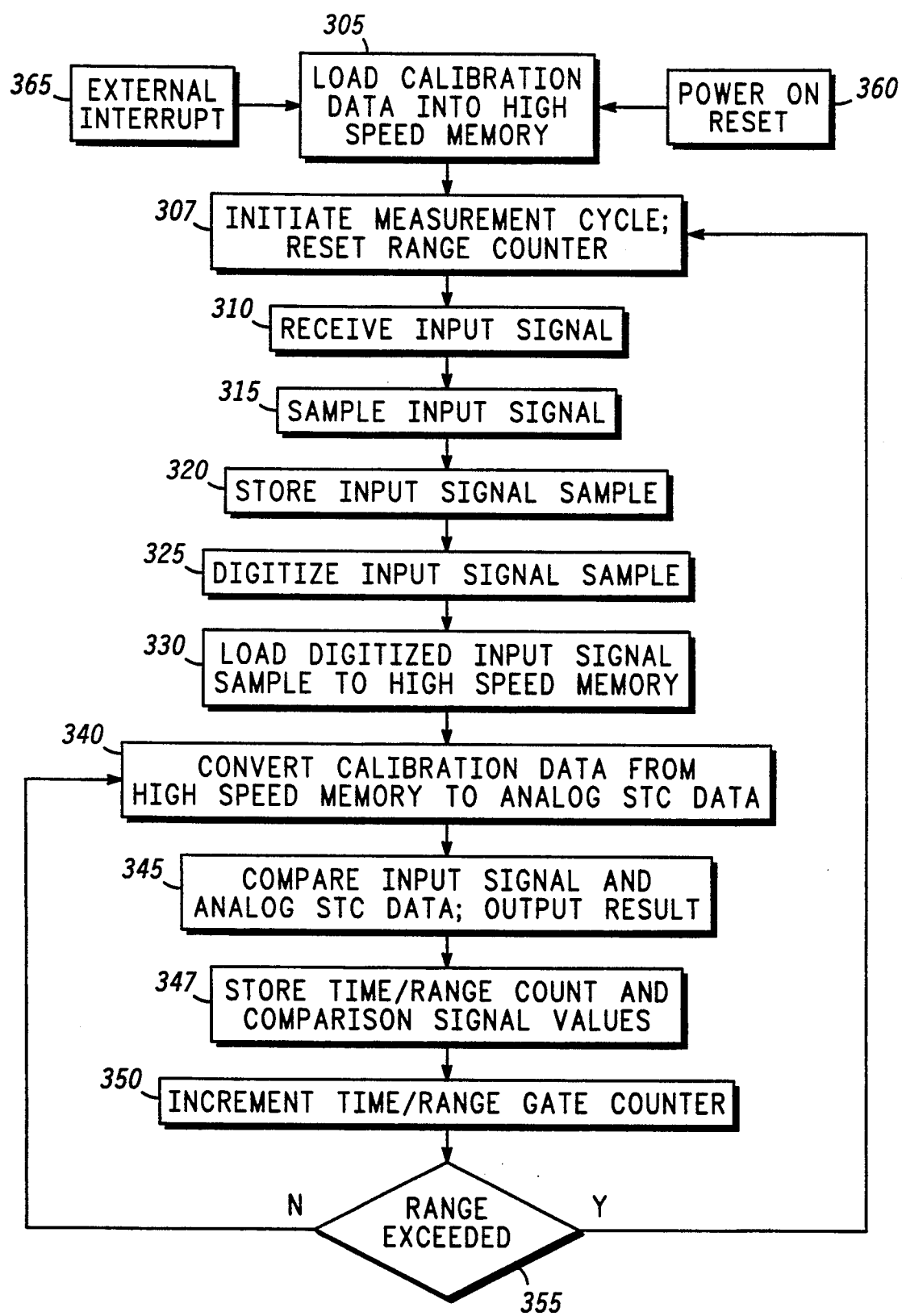
FIG. 5 is a flow diagram illustrating a method for processing signals in pulse-echo measurement apparatus in accordance with the present invention.

FIG. 5 is a flow diagram illustrating method 300 for processing signals in measurement apparatus 100 of FIGS. 3 and 4 in accordance with the present invention. Applying power to the apparatus initiates the steps of resetting all logic circuits (power on reset, block 360), loading calibration data (block 305) from non-volatile memory 159 (see FIG. 4) to high speed digital memory 140 and initiating a measurement cycle and resetting time/range gate counter 150 (block 307).

Alternatively, an external interrupt (block 365) triggers loading of calibration data from non-volatile memory 159 to high speed digital memory 140 (block 305) and initiating a measurement cycle and resetting time/range gate counter 150 (block 307). This allows accurate measurement under differing conditions requiring revised calibration data. In either case, method 300 proceeds as described below following the initiating and resetting steps (block 307).

Each measurement cycle begins with step 307 and comprises the steps of receiving an input signal (block 310) in input selector 105, sampling a peak detected version of the input signal (block 315) and storing the input signal sample (block 320) in sample and hold 125, digitizing, i.e., deriving a binary number representing the analog value of the stored input signal sample (block 325) in A/D converter 135 and the digitized input signal sample selects an address within high speed digital memory 140 (block 330).

The measurement cycle further comprises a loop including the steps (block 340) of converting calibration data in high speed digital memory 140 to analog data in D/A converter 145 to provide an analog STC threshold signal on lead 160.

This analog STC threshold signal is then compared to the input signal on lead 115 to provide (block 345) a comparison output signal on leads 170 and 230 from comparator 165. The comparison output signal on lead 170 and the time/range count on digital buss 217 associated therewith are then coupled to digital buss 232 and latched or stored (block 347) for later output to an external processor (not shown) after time $T_E$ of FIG. 1.

A time/range gate counter such as 150 of FIG. 4 is then incremented (block 350) and decoders within digital control and timing generator 220 determine if the maximum measurement time/range is exceeded (block 355).

If the maximum measurement time/range is not exceeded, the loop beginning with the converting step (block 340) is repeated. If the maximum measurement time/range is exceeded, the measurement cycle is reinitiated, beginning with the initiating step (block 307).

Method 300 thus allows time-dependent calibration data to be rapidly supplied for each echo ranging measurement while retaining the flexibility of supplying a broad variety of calibration data (i.e., various STC threshold signals) from a large memory having slow access to data stored therein, such as, by way of example, non-volatile memory 159 of FIG. 4. Method 300 further permits the dynamic range and accuracy of digital techniques while retaining the speed and throughput advantages of analog approaches.

Figure 2:
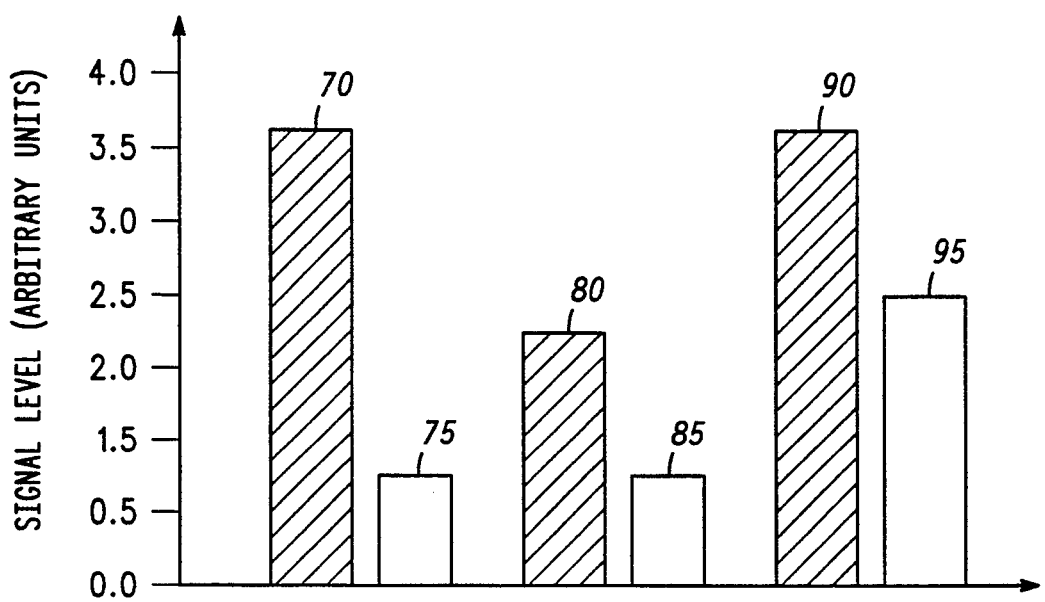
FIG. 2 is a histogram comparing simplified representative examples of expected signal strength and background signal levels for clear air, aerosol and bright background conditions in accordance with the present invention.

FIG. 6 shows exemplary graphs of STC threshold levels 510, 520 and 525 and background signals or ambient noise levels 530 and 540 for the situations represented in FIG. 2 in accordance with the present invention. The vertical axis of FIG. 6 corresponds to STC threshold amplitudes (e.g., detector thresholds), while the horizontal axis corresponds to time. Both axes are calibrated in arbitrary units, with periods $T_{CAL}$ and $T_1$ representing calibration and measurement interval duration, respectively.

Time $T_B$ represents the beginning of a measurement epoch and of pre-measurement interval $T_{CAL}$, time $T_0$ represents the beginning of measurement interval $T_1$ and the end of pre-measurement interval $T_{CAL}$ and time $T_E$ represents the conclusion of measurement interval $T_1$ and a measurement epoch, when a subsequent measurement epoch may begin.

The time between measurement epochs may range from about five clock cycles to several thousand or more clock cycles, depending on the nature of the application. Curves 510 and 520 relate to bright background and clear air conditions, while curve 525 exemplifies an aerosol condition.

Comparing now curves 510, 520 and 525 of FIG. 6 to data 70 through 95 of FIG. 2, upper curve 510 depicts a desirable STC threshold level corresponding to bright background situations appropriate to return signal 90 and background signal 95 amplitudes. Middle curve 520 illustrates a desirable STC threshold level corresponding to clear air scenarios appropriate to return signal 70 and background signal 75 levels. Bottom curve 525 provides an example of a desirable STC threshold level corresponding to aerosol scenarios appropriate to return signal 80 and background signal 85 levels. Line 530 illustrates background signal level 95, while line 540 describes background signal levels 75 and 85.

STC threshold levels corresponding to curves 510, 520 and 525 provide detection thresholds allowing increased dynamic range for varying signal-to-noise ratios and maximum target detection capabilities. STC threshold levels 510, 520 and 525 correspond to analog signals produced by digital-to-analog converter 145 of FIG. 4 and supplied to comparator 165 via lead 160 based on predetermined data stored in non-volatile memory 159 and which are selected based on the results of the pre-look during interval $T_{CAL}$.

C. Example I

An example of the method and apparatus of the present invention in a lidar application and measured results obtained thereby follows. Referring to FIG. 4, apparatus 100 employed in this example utilized a Type SW-124 digitally-controlled switch available from Adams Russel of Burlington, Mass., for analog multiplexing switch 110. In this application, counter 150 of FIG. 4 functions as a time/range gate counter, while latch 225 functions as a time/range gate latch.

The magnitude of the reflected signal varies greatly with the distance to the reflecting object and the prevailing ambient conditions. Thus, estimating the noise or ambient background level appropriate for a given delay is important in accurately deriving a comparator output signal, e.g., target detection signal. The invented system distinguishes received signals reflected by targets from background signal artifacts.

Sampler and A/D converter 123 functions as prelook circuitry and provides a pre-look signal when enabled by control signals coupled via lines 210 and 211 from digital control and timing generator 220. Analog-to-digital converter 135 converts the stored analog pre-look signal on lead 130 into a digital pre-look signal output on digital buss 137.

High speed digital memory 140 selects sensitivity time control data in accordance with the digital pre-look signal present on digital buss 137 and outputs selected sensitivity time control data on digital buss 142, as explained below in connection with discriminating between clear air and bright background conditions and in discriminating between aerosol conditions in sections D through F, infra.

One method for automatically selecting STC information describing threshold levels for the clear air and bright background circumstances is to use the digital pre-look signal on digital buss 137 as the high order address bits for high speed digital memory 140 and to store STC information describing threshold levels in high speed memory 140 such that the digital pre-look signals of digital buss 137 correspond to those STC information describing threshold levels relevant to the information on digital buss 137. For example, pre-look data corresponding to a bright background (e.g., right end of curve 510, FIG. 6) have a larger value than pre-look data corresponding to clear air (right end, curve 520) and so correspond to a larger memory address value.

Using a count from time/range gate counter 150 to provide lower address bits for high speed digital memory 140 provides the appropriate STC information describing threshold levels versus time. The digital STC information describing threshold levels from high speed digital memory 140 are converted to piece-wise-linear analog STC threshold levels by digital-to-analog converter 145 and are supplied to comparator 165 via lead 160 to provide time-varying STC threshold levels such as 54 of FIG. 1 and 510, 520 or 525 of FIG. 6.

Comparator 165 compares piece-wise-linear analog STC threshold levels from digital-to-analog converter 145 to input signals on lead 115. Comparator 165 produces target detection signals on lead 170, indicating the presence or absence of a target.

Figure 17:
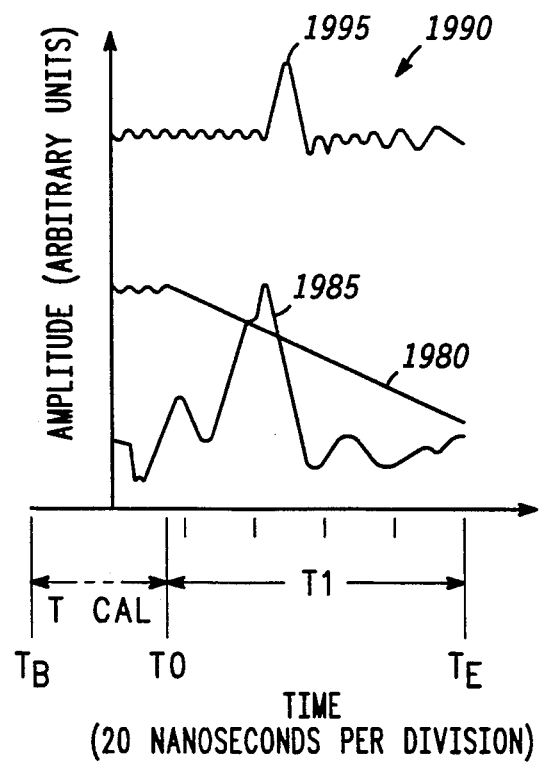
FIG. 17 is a drawing of oscilloscope traces in arbitrary units versus time of measured return signal amplitudes for the apparatus of FIG. 4 in accordance with the present invention.
Figure 18:
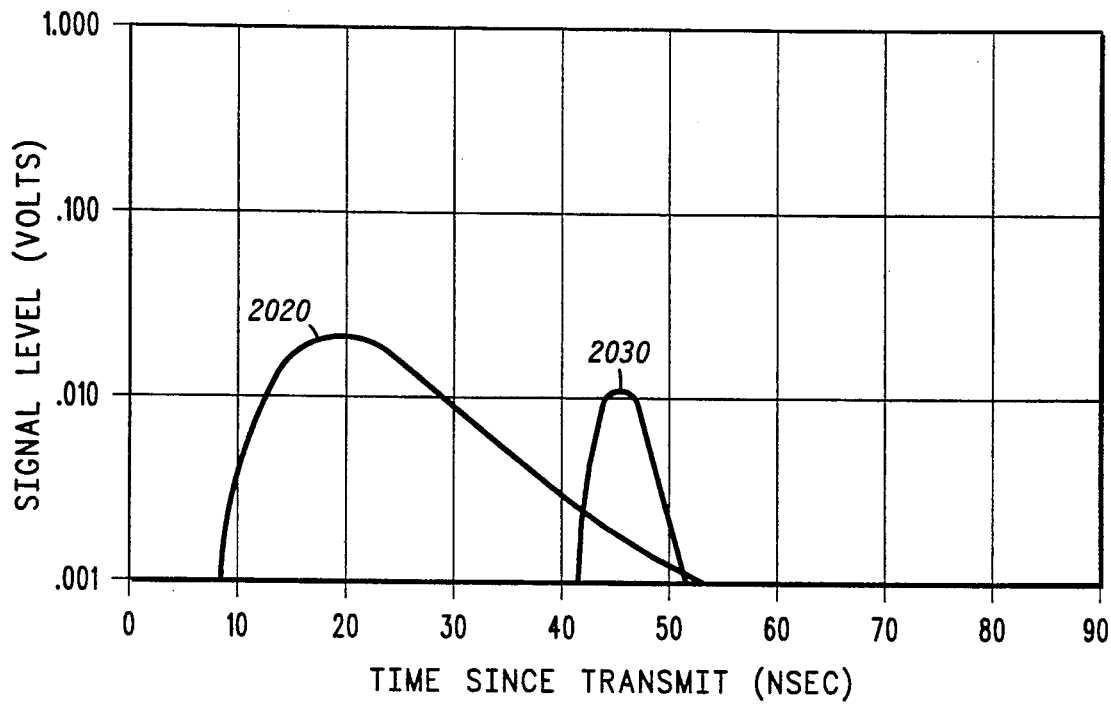
FIG. 18 is a graph of calculated return signal amplitudes for targets and/or aerosols in accordance with the present invention.
Figure 19:
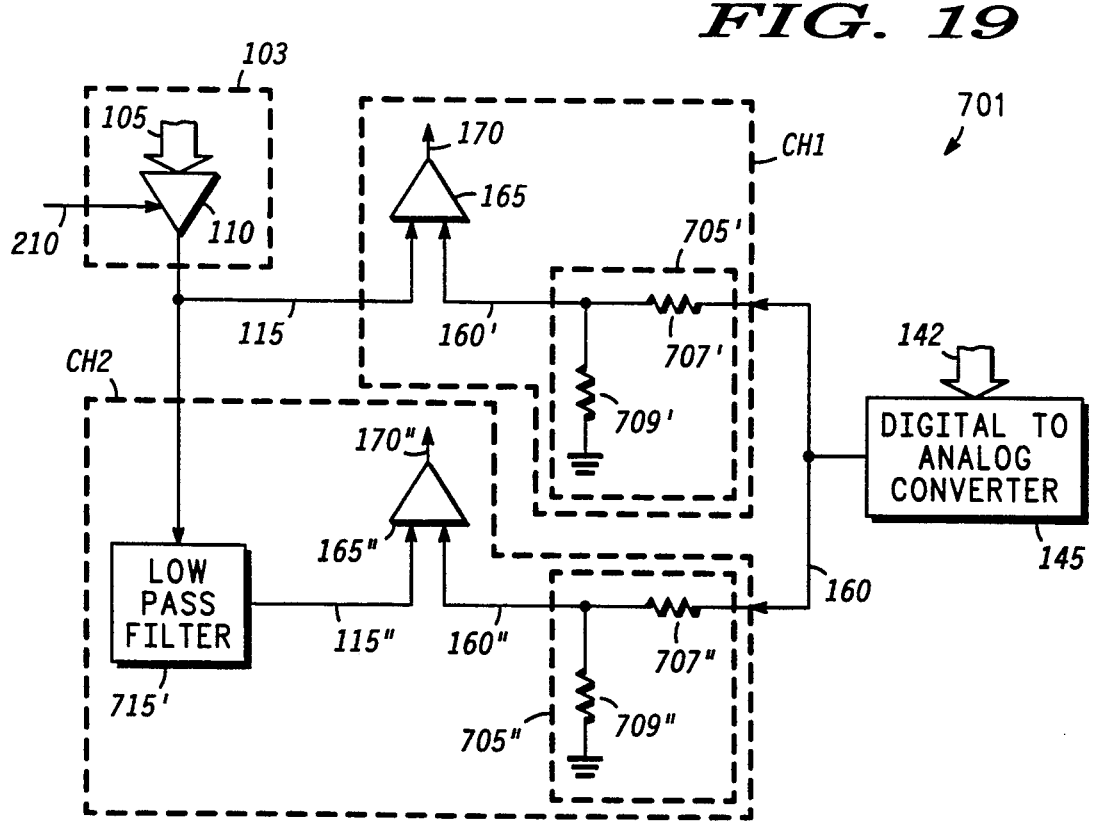
FIG. 19 is a schematic diagram of a subthreshold circuit for detecting the presence of an aerosol in accordance with the present invention.

FIGS. 7 through 18 describe in detail a working example of the present invention, while FIG. 19 provides an example of measured results obtained from the detailed examples of FIGS. 7 through 18.

In the text describing FIGS. 7 through 9 and 12 through 18, several conventions which are commonplace in the digital electronic arts are employed as described hereinbelow. The presence of a small circle between an input or output and the line coupling thereto indicates that the input or output is complemented, i.e., inverted.

An overbar accompanying a label to a line similarly refers to an inverted signal, e.g., $\overline{\text{PRELOAD COMPLETE}}$ refers to the complement of PRELOAD COMPLETE. Alternatively, an asterisk following a label, e.g., WE*, also refers to an inverted signal.

Integrated circuit type numbers are provided herein without the prefixes designating manufacturer or the suffixes describing varied package types and lead configurations (e.g., plastic, ceramic, DIP, flatpack, etc.) for clarity and brevity of explanation. All integrated circuits so described are available from a broad variety of vendors including but not limited to Motorola, Inc., of Phoenix, Ariz.

Pull-down and pull-up resistors are commonly employed in the digital electronic arts and are used to couple to various power supplies, such as, by way of example, −2 Volts (ECL, pull-down), ground (TTL, pull-down) or +5 Volts (TTL, pull-up).

All of these terms are so employed herein in the interests of brevity and explicatory clarity, with the understanding that one skilled in the digital electronic arts will comprehend from the accompanying figures and part numbers the appropriate logic circuit type (i.e., ECL, TTL, CMOS, et cetera) and power supply and/or ground connections. Resistor values are given in Ohms ($\Omega$) or in kilo-Ohms (k$\Omega$).

An embodiment of the present invention described hereinbelow employs digital and analog circuits to realize the functions comprising the subject of the present invention and this entails use of analog ground connections, denoted in FIGS. 8 through 9 and 12 through 18 by triangles, as well as digital ground connections, denoted by symbol comprising three horizontal bars of having decreasing widths. The analog and digital ground connections have common interconnections made in accordance with practices well known in the art.

As will be appreciated by those skilled in the art, while the embodiment described in connection with FIGS. 7 through 18 is realized in the form of discrete integrated circuits the same functions may be realized through a single or a few custom designed integrated circuits to provide the same function.

Figure 7:
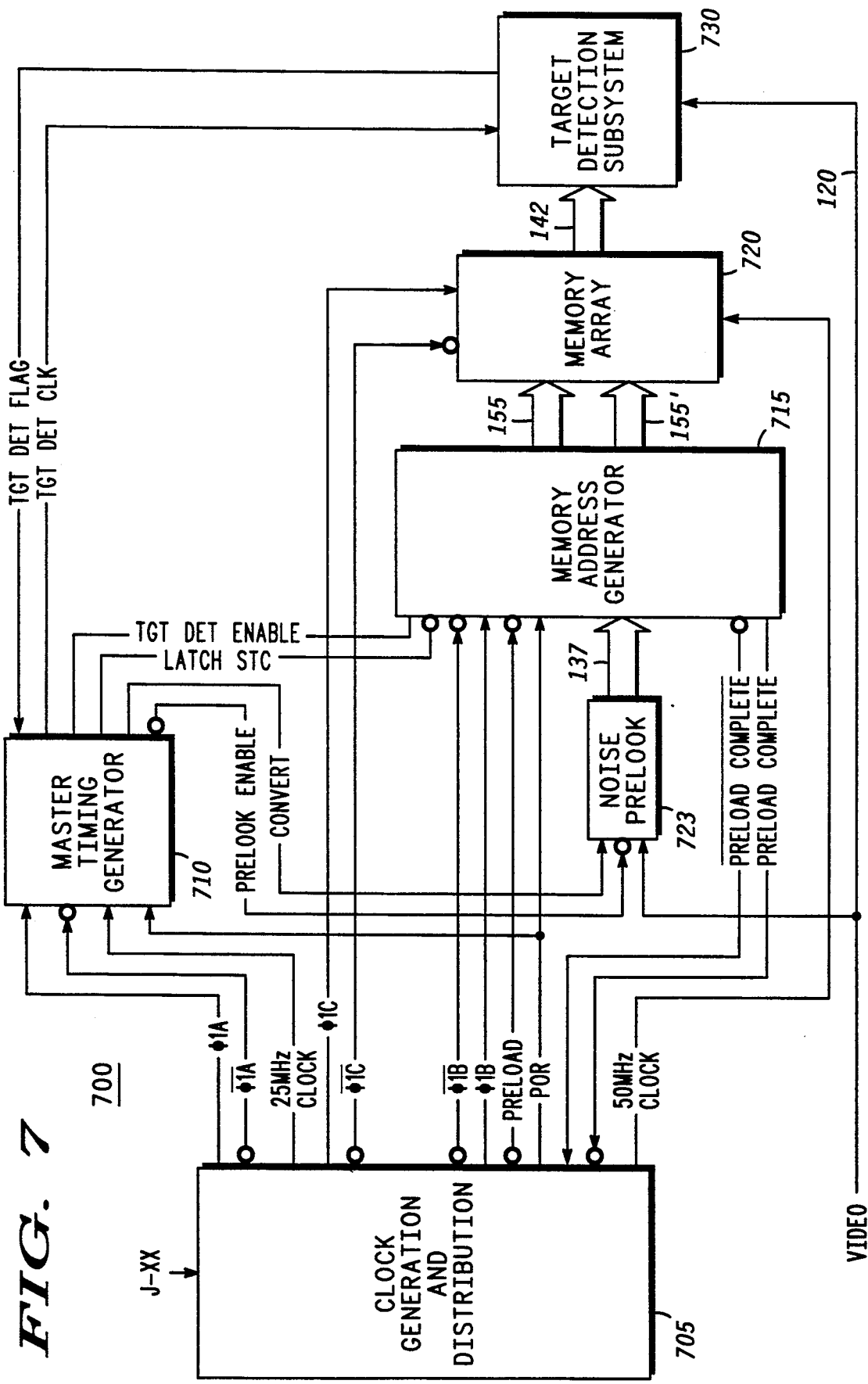
FIG. 7 is a simplified schematic diagram of an embodiment of the present invention.

FIG. 7 is a highly simplified block diagram of circuit 700 of the present invention. Circuit 700 comprises clock generation and distribution circuit 705, master timing generator 710, memory address generator 715, memory array 720, noise prelook 723, target detection subsystem 730, digital busses 137, 142, 155 and 155', and interconnections φ1A, $\overline{\phi 1A}$, φ1B, $\overline{\phi 1B}$, φ1C, φ1C, 50 MHZ CLOCK, 25 MHZ CLOCK, CONVERT, J-XX, LATCH STC, POR, PRELOAD, PRELOAD COMPLETE, $\overline{\text{PRELOAD COMPLETE}}$, PRELOOK ENABLE, TGT DET CLOCK, TGT DET ENABLE, TGT DET FLAG and VIDEO.

In operation, clock signals at frequencies of 100 MegaHertz, 50 MegaHertz and 25 MegaHertz are generated by clock generation and distribution circuit 705 and distributed to master timing generator 710 via lines φ1A and $\overline{\phi 1A}$ (100 Megahertz and line 25 MHZ CLOCK (25 MegaHertz), to memory address generator 715 via lines φ1B and $\overline{\phi 1B}$ (100 MegaHertz) and to memory array 720 via lines φ1C and $\overline{\phi 1C}$ (100 MegaHertz) and line 50 MHZ CLOCK (50 MegaHertz).

A separate clocking signal is generated by master timing generator 710 and is distributed to target detection subsystem 730 via line TGT DET CLOCK (100 MegaHertz, gated). Clock generation and distribution circuit 705 also generates a signal which is coupled via line PRELOAD to memory array 720 which initiates loading of STC information describing threshold levels from a non-volatile memory (e.g., non-volatile memory 159 of FIG. 4) to a high speed memory (e.g., high speed memory 140 of FIG. 4), both within memory array 720, when line POR is activated by application of electrical power to master timing generator 710.

Signals on lines PRELOAD and $\overline{\text{PRELOAD}}$ from dual MS flip-flop U0125 of clock generation and distribution circuit 705 are reset when memory address generator 715 has provided all address data for loading of the high speed memory within memory array 720. This is condition indicated by signals coupled via lines PRELOAD COMPLETE and $\overline{\text{PRELOAD COMPLETE}}$.

Figure 8:
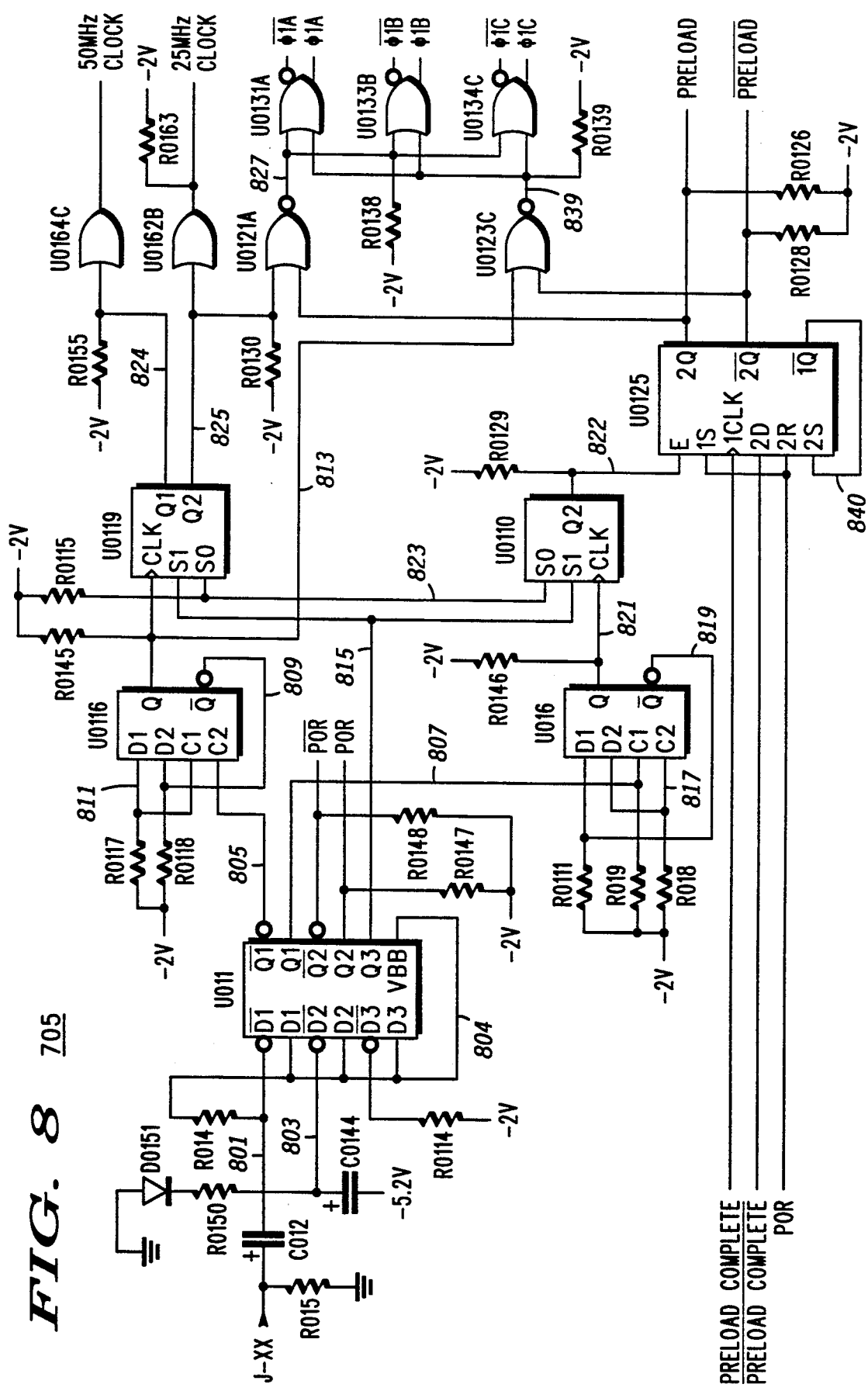
FIG. 8 is a schematic diagram of a clock generation and distribution circuit in accordance with an embodiment of the present invention.
Figure 9:
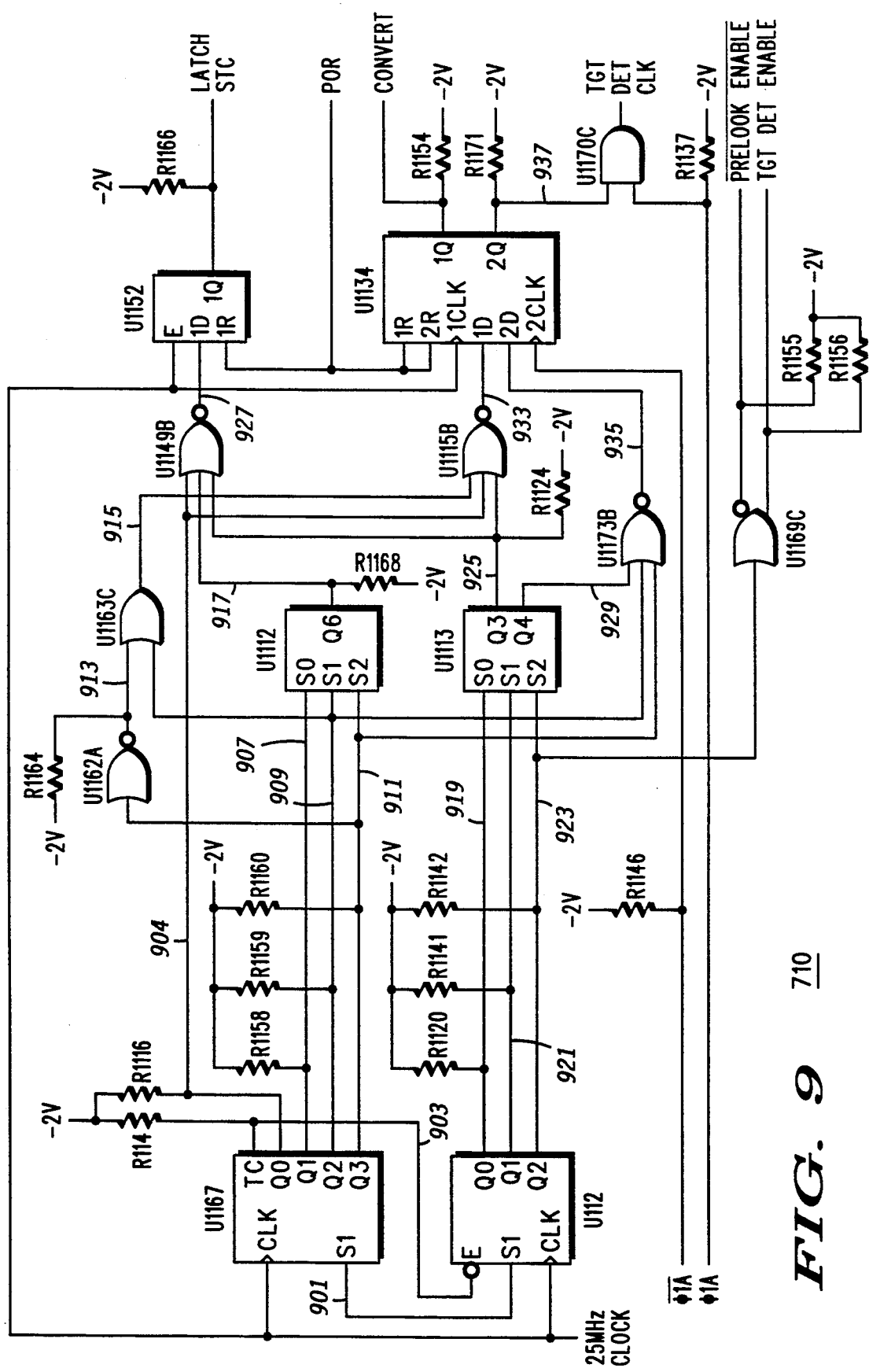
FIG. 9 is a schematic diagram of a master timing generator circuit in accordance with an embodiment of the present invention.

FIGS. 8 and 9 depict clock generation and distribution circuit 705 and master timing generator 710 of FIG. 7, respectively, which together correspond to digital timing and control generator 220 of FIGS. 3 and 4.

FIG. 8 is a schematic diagram of clock generation and distribution circuit 705 in accordance with an embodiment of the present invention. Clock generation and distribution circuit 705 comprises triple flip-flop U011, high speed D flip-flops UO116 and U016, up/down counters U0119 and UO110, dual MS flip-flop U0125 and OR/NOR gates UO164C, U0162B, U0121A, U0123C, U0131A, U0133B and U0134C, which OR/NOR gates are Type 1015 integrated circuits.

Clock generation and distribution circuit 705 further comprises input line J-XX and R015 and C012 coupled in shunt and in series therewith, respectively. Input line J-XX is coupled to an external clocking circuit (not shown) which supplies, by way of example and not intended to be limiting, an ECL-compatible 400 MegaHertz square wave signal thereto.

Input line J-XX distributes this primary clocking signal to a divider chain (U011, U0116, U0119) which provide clocking signals having frequencies of one-fourth (φ1A, $\overline{\phi 1A}$, φ1B, φ1C and $\overline{\phi 1C}$), one-eighth (50 MHZ CLOCK) and one sixteenth (25 MHZ CLOCK) that of the primary clocking frequencies, respectively. R015 is a 50 Ω resistor while C012 is a 100 picoFarad capacitor. C012 is coupled to line 801 and to input of triple flip-flop U011, which is a Type 10116 triple flip-flop. R014, is a one kΩ resistor, is coupled between input line 804. Line 804 couples input D1, D2 and D3 of triple flip-flop U011 to $V_{BB}$, a $-1.29$ Volt ECL power supply.

Second input $\overline{D2}$ of triple flip-flop U011 is coupled via line 803 to an R-C circuit comprising C0144, which is a 1.0 microFarad capacitor. C0144 is coupled between line 803 and a power distribution line (not shown) coupled to $-5.2$ Volts. Line 803 is also coupled to a series combination of D0151 and R0150. D0151 is a 1N4148 silicon signal diode having an anode coupled to ground. R0150 is a 4.7 kΩ resistor coupled between a cathode of diode D0151 and line 803. D0151, R0150 and C0144 form an R-C circuit.

This R-C circuit charges with a characteristic time constant of about 5 milliseconds when power is initiated or re-initiated to clock generation and distribution circuit 705. Initially, C0144 maintains second input $\overline{D2}$ of triple flip-flop U011 at a negative voltage, causing the second flip-flop of triple flip-flop U011 to always take the same state following the first clock cycle after power initiation and allowing detection of power initiation and/or re-initiation.

The Q2 and $\overline{Q2}$ outputs of triple flip-flop U011 are coupled to lines POR and $\overline{\text{POR}}$, respectively, and to 100 Ω pull-down resistors R0148 and R0147, respectively. Lines POR and/or $\overline{\text{POR}}$ couple signals to U0125 of clock generator and distribution circuit 705 and to master timing generator 710, memory address generator 715 and to target detection subsystem 730 of circuit 700 of FIG. 7 to signal a power on reset when appropriate.

Third input $\overline{D3}$ to triple flip-flop U011 is coupled to R0114, which is a 100 Ω pull-down resistor. Output Q3 of triple flip-flop U011 is coupled via line 815 to inputs S1 of up/down counters U0119 and U0110, which are Type 10136 up/down counters.

Output $\overline{Q1}$ of triple flip-flop U011 is coupled via line 805 to clock input C2 of high speed D flip-flop U0116 and supplies a 200 MegaHertz signal thereto. The 200 MegaHertz signal is derived by flip-flop U011 from the 400 MegaHertz signal coupled to input $\overline{D1}$ from input J-XX. Output Q1 of triple flip-flop U011 is coupled to clock input C1 of high speed D flip-flop U016 via line 807 and supplies a 200 MegaHertz signal thereto. High speed D flip-flops U0116 and U016 are Type 12090 integrated circuits.

High speed D flip-flop U0116 has inputs D1 and C1 coupled to line 811. Line 811 is also coupled to R0117, which is a 100 Ω pull-down resistor. High speed D flip-flop U0116 has output Q coupled to input D2 via line 809. Line 809 is also coupled to R0118, which is a 50 Ω pull-down resistor.

High speed D flip-flop U0116 has output Q coupled to line 813. Output Q of high speed D flip-flop U0116 supplies a 100 MegaHertz clock signal to line 813. Line 813 also couples to R0145, which is a 50 Ω pull-down resistor, to input CLK of up/down counter U0119 and to an input of OR/NOR gate U0123C.

Up/down counter U0119 has input S0 coupled to line 823. Line 823 is also coupled to input S0 of up/down counter U0110 and to R0115, which is a 100 Ω pull-down resistor. Up/down counter U0119 has outputs Q1 and Q2 coupled to R0155 and R0130, respectively, which are 100 Ω pull-down resistors. Output Q1 is further coupled to line 824 and thereby to an input of OR/NOR gate U0164C. OR/NOR gate U0164C has an output coupled to line 50 MHZ CLOCK. Output Q2 is further coupled to line 825 and thereby to an input of OR/NOR gate U0162B. OR/NOR gate U0162B has an output coupled R0163, which is a 100 Ω pull-down resistor, and to line 25 MHZ CLOCK.

OR/NOR gates U0162B and U0164C act as buffers and have all other input and output leads open circuited. Up/down counter U0119 divides the 100 MegaHertz input clock signal present at input CLK to provide 50 and 25 MegaHertz clocking signals at outputs Q1 and Q2, which are coupled to lines 50 MHZ CLOCK and 25 MHZ CLOCK, respectively.

Output Q2 of up/down counter U0119 is also coupled to an input of OR/NOR gate U0121A. Another input of OR/NOR gate U0121A is coupled to line PRELOAD, described infra. An inverted output of U0121A is coupled to line 827 and thereby to R0138, which is a 50 Ω pull-down resistor, and to inputs to OR/NOR gates U0131A, U0133B and U0134C. Another input of each of OR/NOR gates U0131A, U0133B and U0134C is coupled to line 829. Line 829 is coupled to R0139, which is a 50 Ω pull-down resistor, and to a complemented output of OR/NOR gate U0123C. OR/NOR gate U0131A supplies clocking signals to lines $\phi 1A$ an non-inverting and inverting outputs, respectively.

OR/NOR gate U0133B supplies clocking signals to lines $\phi 1B$ and $\overline{\phi 1B}$ via non-inverting and inverting outputs, respectively. OR/NOR gate U0134C supplies clocking signals to lines $\phi 1C$ and $\overline{\phi 1C}$ via non-inverting and inverting outputs, respectively.

High speed D flip-flop U016 has inputs D2 and C2 coupled to line 817. Line 817 is also coupled to R018, which is a 100 Ω pull-down resistor. High speed D flip-flop U016 has input C1 coupled to line 807 and to pull-down resistor R019 and has output $\overline{Q}$ coupled to input D1 via line 819. Line 819 is also coupled to R0111, which is a 50 Ω pull-down resistor. High speed D flip-flop U016 has output Q coupled to line 821. Output Q of high speed D flip-flop U016 supplies a 100 MegaHertz clock signal to line 821. Line 821 is also coupled to R0146, which is a 50 Ω pull-down resistor, and to input CLK of up/down counter U0110.

Up/down counter U0110 has output Q2 coupled to R0129, which is a 100 Ω pull-down resistor, and to line 822. Up/down counter U0110 delivers a 100 MegaHertz clock signal to line 822. Line 822 is also coupled to input E of dual MS flip-flop U0125, which is a Type 10131 dual MS flip-flop.

Dual MS flip-flop U0125 has output $\overline{1Q}$ coupled to line 840 and to input 2S and has inputs 1S and 2R coupled to line POR, input 1CLK coupled to line PRELOAD COMPLETE and input 2D coupled to line $\overline{\text{PRELOAD COMPLETE}}$. Dual MS flip-flop U0125 has outputs 2Q and $\overline{2Q}$ coupled to R0126 and R0128, respectively, which are 100 Ω pull-down resistors. Outputs 2Q and $\overline{2Q}$ of dual MS flip-flop U0125 are coupled to lines PRELOAD and $\overline{\text{PRELOAD}}$, respectively.

Dual MS flip-flop U0125 is set by a power on reset signal from line POR and in turn sets the PRELOAD and $\overline{\text{PRELOAD}}$ lines to effect loading of data from non-volatile memory to high speed memory in memory array 720 of FIG. 7. Dual MS flip-flop U0125 is reset by the PRELOAD COMPLETE and $\overline{\text{PRELOAD COMPLETE}}$ lines when data have been loaded into high speed memory, resetting the signals coupled by lines PRELOAD and $\overline{\text{PRELOAD}}$.

FIG. 9 is a schematic diagram of master timing generator 710 in accordance with an embodiment of the present invention. Master timing generator 710 comprises up/down counters U1167 and U112, decoders U1112 and U1113, dual MS flip-flops U1152 and U1134, AND gate U1170C and OR/NOR gates U1162A, U1163C, U1149B, U1115B, U1173B and U1169C, which OR/NOR gates are Type 10105 integrated circuits.

Up/down counters U1167 and U112 are Type 10136 integrated circuits and have inputs CLK coupled to line 25 MHZ CLOCK. Inputs S1 of up/down counters U1167 and U112 are coupled to line 901. Output TC of up/down counter U1167 is coupled to line 903. Line 903 is in turn coupled to R114, which is a 100 Ω pull-down resistor, and to input E of up/down counter U112. Up/down counters U1167 and U112 are thus coupled in cascade to form a single counting unit.

Up/down counter U1167 has output Q0 coupled to R1116, which is a 100 Ω pull-down resistor, and to line 904. Up/down counter U1167 also has outputs Q1 through Q3 coupled to R1158 through R1160, which are 100 Ω pull-down resistors, and to lines 907, 909 and 911, respectively. Lines 907, 909 and 911 are coupled to inputs S0, S1 and S2, respectively, of decoder U1112. Line 909 is also coupled to inputs of OR/NOR gates U1163C and U1173B.

Line 911 is also coupled to inputs of OR/NOR gates U1162A and U1173B. Line 913 couples a complemented output of OR/NOR gate U1162A to R1164, which is a 100 Ω pull-down resistor, and also to an input of OR/NOR gate U1163C. OR/NOR gate U1163C has an output coupled to line 915.

Up/down counter U112 has outputs Q0 through Q2 coupled to 100 Ω pull-down resistors R1120, R1141 and R1142, respectively, and to lines 919, 921 and 923, respectively. Lines 919, 921 and 923 are coupled to inputs S0, S1 and S2, respectively, of decoder U1113. Line 923 is also coupled to an input of OR/NOR gate U1169C. A complemented output of OR/NOR gate U1169C is coupled to line $\overline{\text{PRELOOK ENABLE}}$ and a non-inverting output of OR/NOR gate U1169C is coupled to line TGT DET ENABLE. Lines $\overline{\text{PRELOOK ENABLE}}$ and TGT DET ENABLE are coupled to R1155 and R1156, which are 100 Ω pull-down resistors, respectively.

Decoder U1113 has output Q3 coupled to line 925 and to R1124, which is a 100 Ω pull-down resistor, and also has output Q4 coupled to line 929. Line 925 is coupled to inputs of OR/NOR gates U1149B and U1115B. OR/NOR gate U1149B has inputs coupled to lines 904 and 917 and a complemented output coupled via line 927 to input 1D of dual MS flip-flop U1152.

Dual MS flip-flop U1152 is a Type 10131 dual MS flip-flop and has input E coupled to line 25 MHZ CLOCK and input 1R coupled to line POR. Output 1Q of dual MS flip-flop U1152 is coupled to R1166, which is a 100 Ω pull-down resistor, and to line LATCH STC. Dual MS flip-flop U1152, decoders U1112 and U1113 and OR/NOR gate U1149B thus decode the occurrence of the end of a prelook interval (time TD of FIGS. 1 and 6) and set and reset signals to line LATCH STC accordingly.

OR/NOR gate U1115B has inputs coupled to lines 904, 915 and 925 and a complemented output coupled to line 933. Line 933 is coupled to input 1D of dual MS flip-flop U1134. Dual MS flip-flop U1134 is a Type 10131 dual MS flip-flop. Dual MS flip-flop U1134 has inputs 1R and 2R coupled to line POR, input 1CLK coupled to line 25 MHZ CLOCK and output 1Q coupled to line CONVERT and to R1154, which is a 100 Ω pull-down resistor.

Dual MS flip-flop U1134, up/down counter U1167 and U112, decoder U1113 and OR/NOR gate U1173B thus cooperate to decode appropriate times to trigger D/A conversion in noise prelook 723 of FIG. 7 and to set and reset signals to line CONVERT accordingly.

OR/NOR gate U1173B has inputs coupled to lines coupled to line 935. Line 935 is coupled to input 2D of dual MS flip-flop U1134. R1146, which is a 50 Ω pull-down resistor is coupled to line $\overline{\phi 1A}$ and to input 2CLK of dual MS flip-flop U1134. Line $\overline{\phi 1A}$ couples a 100 MegaHertz clocking signal to input 2CLK of dual MS flip-flop U1134. Dual MS flip-flop U1134 has output 2Q coupled to R1171, which is a 100 Ω pull-down resistor, and to line 937. Line 937 is coupled to an input of AND gate U1170C. AND gate U1170C is a Type 10104 AND gate. AND gate U1170C has an input coupled to line $\phi 1A$ and has an output coupled to line TGT DET CLOCK.

AND gate U1170C thus provides a gated 100 Mega-Hertz clock signal to target detection subsystem 730 via line TGT DET CLOCK following conversion of analog input data to a digital value in noise prelook 723 (i.e., during measurement interval $T_1$ of FIGS. 1 and 6).

The relative timing of signals coupled via lines LATCH STC, CONVERT, TGT DET CLK, $\overline{\text{PRE-LOOK ENABLE}}$ and TGT DET ENABLE can be readily and easily changed by altering the interconnection of decoders U1112 and U1113 and the attendant OR/NOR gates of FIG. 9, as is well known in the art, however, the timing obtained by the interconnections illustrated and described hereinabove is provided by way of convenient example for the purpose of illustration.

Figure 10:
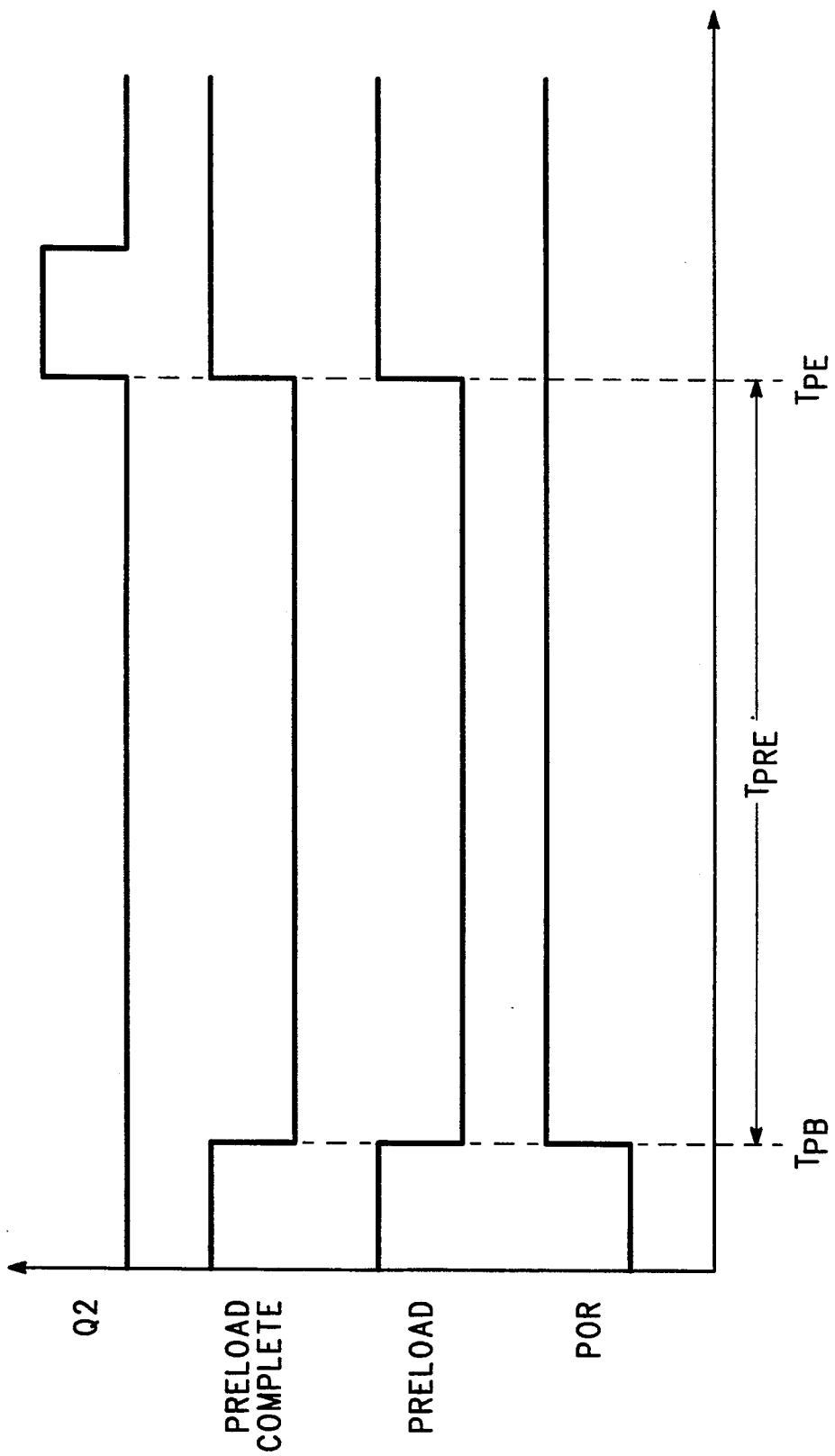
FIG. 10 is a timing diagram for pre-measurement preparation of a circuit in accordance with an embodiment of the present invention.

FIG. 10 is a timing diagram for pre-measurement preparation of circuit 700 in accordance with an embodiment of the present invention. FIG. 10 shows levels of signals PRELOAD COMPLETE, PRELOAD and POR and a signal level of a signal coupled to output Q2 of U213 of FIG. 12 (described infra) versus time.

The time axis of FIG. 10 is not to scale and shows interval TPRE with beginning time $T_{PB}$ and ending time $T_{PE}$. The events associated with pre-measurement preparation of circuit 700 need only occur once and must have occurred since power was initiated to circuit 700 and prior to initiation of any measurement epoch.

When the signal coupled via line POR goes high, signals PRELOAD COMPLETE and PRELOAD go low. Counters in memory address generator 715 of FIG. 7 supply address data to memory array 720 and STC information describing threshold levels are loaded from non-volatile memory to high speed memory within memory array 720.

Figure 12:
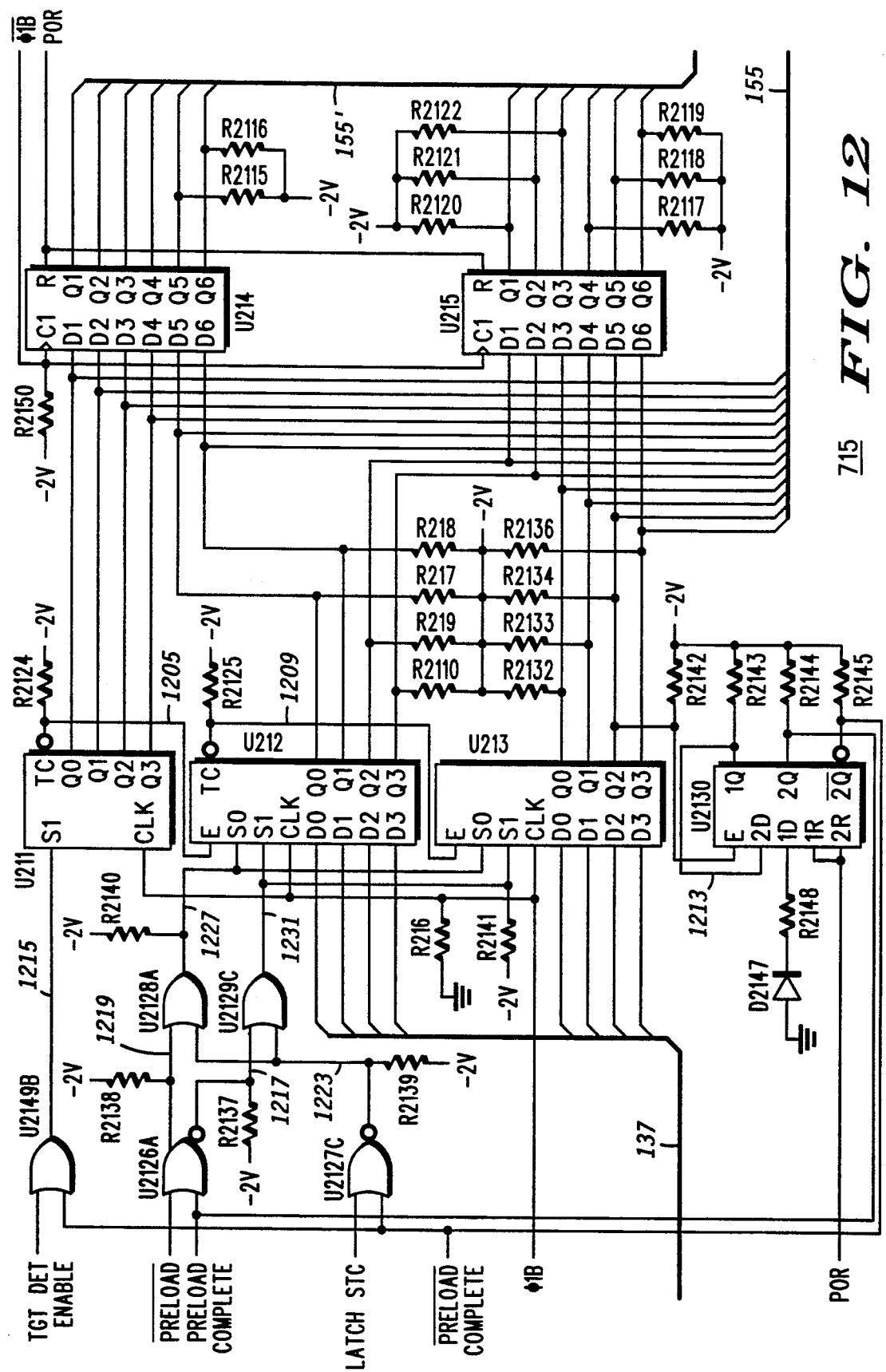
FIG. 12 is a schematic diagram of a memory address generator circuit in accordance with an embodiment of the present invention.

When all 1024 memory locations of high speed memory (see FIG. 14) have been loaded, output Q2 of U213 of FIG. 12 becomes a logical "1", signals coupled via lines PRELOAD COMPLETE and PRELOAD change state and the preload operation is completed.

Figure 11:
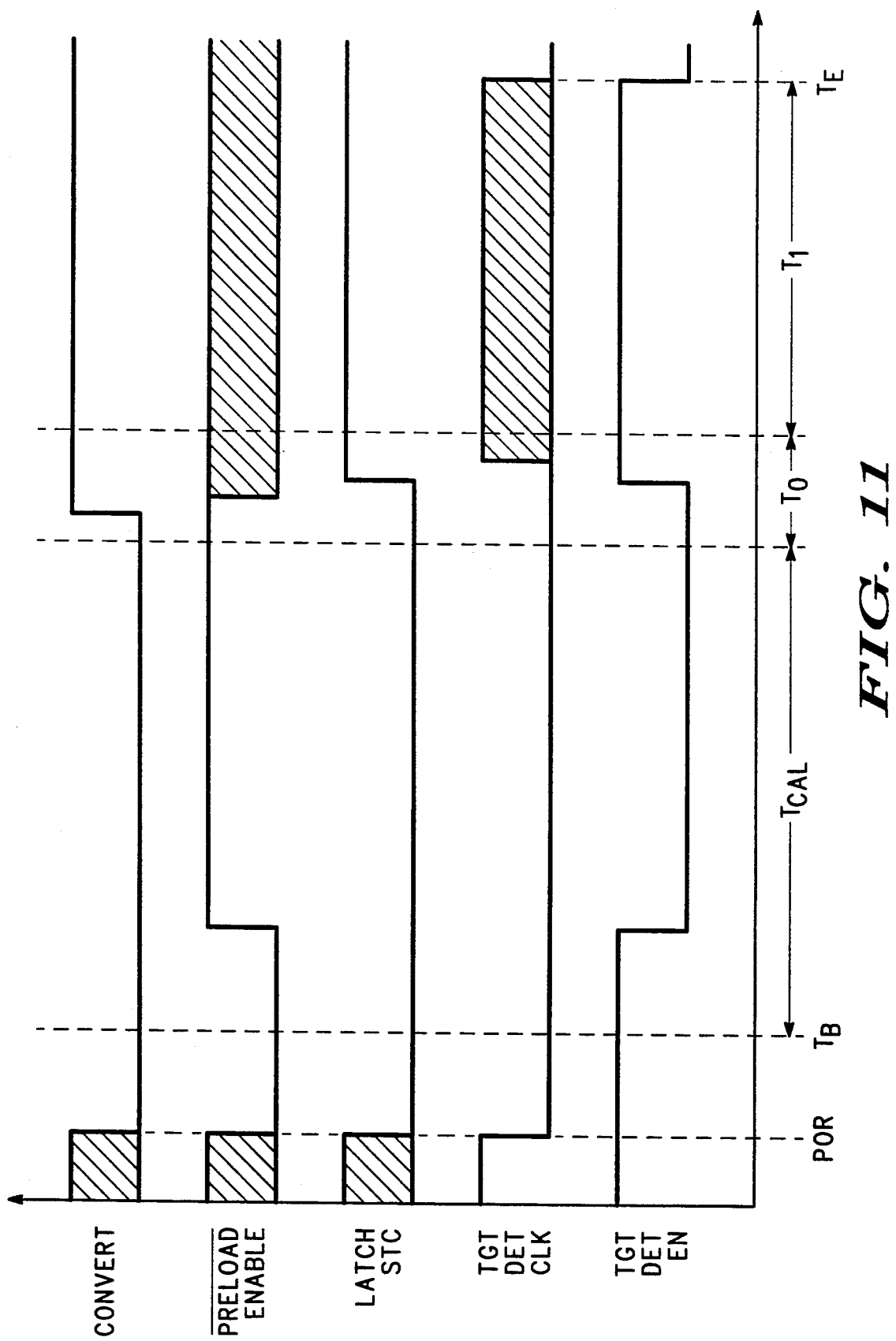
FIG. 11 is a timing diagram for operation of a circuit in accordance with an embodiment of the present invention.

FIG. 11 is a timing diagram for operation of circuit 700 in accordance with an embodiment of the present invention. FIG. 11 shows signals CONVERT, LATCH STC, $\overline{\text{PRELOOK ENABLE}}$, TGT DET CLOCK and TGT DET ENABLE versus time. The time axis of FIG. 11 is not to scale and shows intervals $T_{CAL}$, $T_0$ and $T_1$ (see FIGS. 1 and 6), bounded by times $T_B$ and $T_E$ and preceded by $T_{POR}$. Interval $T_0$ was shown as time $T_0$ in FIGS. 1 and 6, however, in FIG. 11 events occurring within time interval $T_0$ are being shown in the sequence in which they occur. For the purposes of FIGS. 1 and 6 (supra) and 19 (infra), interval $T_0$ may be considered to be a single instant. The events occurring after time $T_B$ may repeat, i.e., time $T_E$ may be followed at any later time by $T_B$.

Prior to time $T_{POR}$, the states of all signals shown in FIG. 11 are irrelevant. At time $T_{POR}$ or following time $T_E$, the signals coupled via lines CONVERT, LATCH STC, $\overline{\text{PRELOOK ENABLE}}$, TGT DET CLOCK and TGT DET ENABLE are all set low. Shortly after time $T_B$, the signal coupled via line $\overline{\text{PRELOOK ENABLE}}$ goes high (and the signal coupled via line TGT DET ENABLE goes low; these two signals are complements of one another), triggering noise prelook 723 of FIG. 7 to sample and hold values from signals coupled via line VIDEO.

During interval $T_0$, a sampled signal value is converted to a digital number within noise prelook 723 in response to a change in state of signals coupled via line CONVERT. Following this, signal LATCH STC changes state, latching the STC value from noise prelook 723 in memory address generator 715 of FIG. 7 (supra) and FIG. 12 (infra).

Memory address generator 715 provides address data which allow subsequent portions of a selected STC curve to be accessed from memory array 720. A signal coupled via line TGT DET CLOCK is enabled and a 100 MegaHertz clocking signal is provided thereby to target detection subsystem 730 during the remainder of interval $T_0$ and during interval $T_1$. The signal coupled via line TGT DET CLOCK has a frequency of one-fourth that of the primary system clocking signal (input J-XX of FIG. 7), during those intervals when the former clocking signal is enable.

FIG. 12 is a schematic diagram of memory address generator 715 of FIG. 7 in accordance with an embodiment of the present invention. Memory address generator 715 comprises up/down counters U211, U212 and U213, which in this embodiment are Type 10138 up-/down counter integrated circuits, dual MS flip-flop U2130, which is a Type 10131 dual MS flip-flop integrated circuit, OR/NOR gates U2149B, U2126A, U2127C, U 2128A and U2129C, all ECL OR/NOR gates which are Type 10105 integrated circuits, HEX D MS flip-flops U214 and U215 which are Type 10186 HEX D MS flip-flop integrated circuits, and resistors R217 through R2110, R2115 through R2122, R2124, R2125, R2132 through R2125, R2148 and R2150, which are Ω pull-down resistors and R216 and R2150, which are 50 Ω pull-down resistors.

Memory address generator circuit 715 further comprises digital busses 137, 155 and 155' and interconnect lines $\phi 1B$, $\overline{\phi 1B}$, LATCH STC, POR, $\overline{\text{PRELOAD}}$, PRELOAD COMPLETE, PRELOAD COMPLETE and TGT DET ENABLE.

R2115 through R2122 are coupled to digital buss 155', which is also coupled to outputs Q1 through Q6 of HEX D MS flip-flops U214 and U215. Inputs D1 through D6 of HEX D MS flip-flops U214 and U215 are coupled to outputs Q0 through Q3 of up/down counters U211, U212 and U213 via digital buss 155. Inputs C1 of Hex D MS flip-flops U214 and U215 are coupled to line $\overline{\phi 1B}$. Line $\phi 1B$ supplies a 100 Mega-Hertz clocking signal to HEX D MS flip-flops U214 and U215.

R217 through R2110 and R2132 through R2136 are coupled to lines corresponding to eight upper bits of digital buss 155. R216 coupled to line $\phi$1B and to inputs CLK of up/down counters U211, U212 and U213. R2124 is coupled to output TC of up/down counter U211, which is also coupled to input E of up/down counter U212 via line 1205. Similarly, resistor R2125 is coupled to output TC of up/down counter U212, which is also coupled to input E of up/down counter U213 via line 1209. Up/down counters U211, U212 and U213 are thus coupled in cascade to perform a sequential count. Line POR is coupled to inputs R of HEX D MS flip-flops U214 and U215.

Dual MS flip-flop U2130 has input E coupled to output Q2 of up/down counter U213 via line 1220. Line 1220 is also coupled to pull-down resistor R2142. Input 1D of dual MS flip-flop U2130 is coupled to a series combination of R2148 and D0147. D0147 has a cathode coupled to R2148 and an anode coupled to ground. R2148 couples input 1D of dual MS flip-flop U2130 to an anode of D0147. D0147 is a Type 1N4148 Si small signal diode. Inputs 1R and 2R of dual MS flip-flop U2130 are coupled to line POR. Output 1Q of dual MS flip-flop U2130 is coupled to input 2D thereof via line 1213, and is also coupled to R2143. Outputs 2Q and $\overline{2Q}$ of dual MS flip-flop U2130 are coupled to lines PRELOAD COMPLETE and $\overline{\text{PRELOAD COMPLETE}}$, respectively, and to R2144 and R2145, respectively.

OR/NOR gate U2149 has an input coupled to line TGT DET ENABLE and a second input coupled to line $\overline{\text{PRELOAD COMPLETE}}$ and has an output coupled to input S1 of up/down counter U211. OR/NOR gate U2126 has an input coupled to line PRELOAD and a second input coupled to line PRELOAD COMPLETE. OR/NOR gate U2126 also has inverting and non-inverting outputs coupled to R2137 and R2138, respectively, and to inputs of OR/NOR gates U2128A and U2129C via lines 1219 and 1217, respectively.

OR/NOR gate U2127C has inputs coupled to lines $\overline{\text{PRELOAD COMPLETE}}$ and LATCH STC and has an inverting output coupled to line 1223. Line 1223 is further coupled to R2139 and to inputs to OR/NOR gates U2128A and U2129C. OR/NOR gates U2128A and U2129C have non-inverting outputs coupled to lines 1227 and 1231, respectively, and to R2140 and R2141, respectively. Line 1227 is coupled to inputs S0 of up/down counters U212 and U213. Line 1231 is coupled to inputs S1 of up/down counters U212 and U213.

OR/NOR gates U2149B, U2126A, U2127C, U2128A and U2129C control up/down counters U211, U212 and U213, allowing up/down counters U211, U212 and U213 to first generate addresses for loading STC information describing threshold levels from non-volatile memory to high speed memory within memory array 720 of FIG. 7 and to then pass STC selection data and subsequent STC addressing data via digital busses 155 and 155' in response to control signals derived from clock generation and distribution circuit 705 and master timing generator 710 of FIG. 7.

In initial or "power up" operation corresponding to the events of FIG. 11 and occurring prior to any of the events associated with FIGS. 1 and 6, memory address generator circuit 715 responds to signals coupled via line POR, resetting both HEX D MS flip-flops U214 and U215 and both flip-flops in dual MS flip-flop U2130 and also setting the signal coupled via line PRELOAD COMPLETE low (to a logical "0"). This signal together with the signals coupled via lines $\overline{\text{PRELOAD COMPLETE}}$ and $\overline{\text{PRELOAD}}$ sets OR/NOR gates U2149B, U2126A, U2127C, U2128A and U2129C to allow up/down counters U211, U212 and U213 to begin counting sequentially through address locations in response to clocking signals coupled via line $\phi$1B.

The sequential address locations output from up/down counters U211, U212 and U213 are coupled to digital buss 155, which is in turn coupled to inputs D1 through D6 of HEX D MS flip-flops U214 and U215. A count from up/down counters U211, U212 and U213 is clocked through HEX D MS flip-flops U214 and U215 in response to clock signals coupled via line $\overline{\phi 1B}$ to provide sequential address data on digital buss 155'.

When address data coupled via digital buss 155 reach $2^{10}$ (i.e., 1024), input E to dual MS flip-flop U2130 is set to a logical "1" by signals coupled from output Q2 of up/down counter U213 via line 1220, resetting output Q1 of dual MS flip-flop U2130 and setting input 2D of dual MS flip-flop U2130 to a logical "1", resetting signals coupled via lines PRELOAD COMPLETE and $\overline{\text{PRELOAD COMPLETE}}$. This causes up/down counters U212 and U213 to pass STC selection data on buss 137 to busses 155 and 155'.

Figure 13:
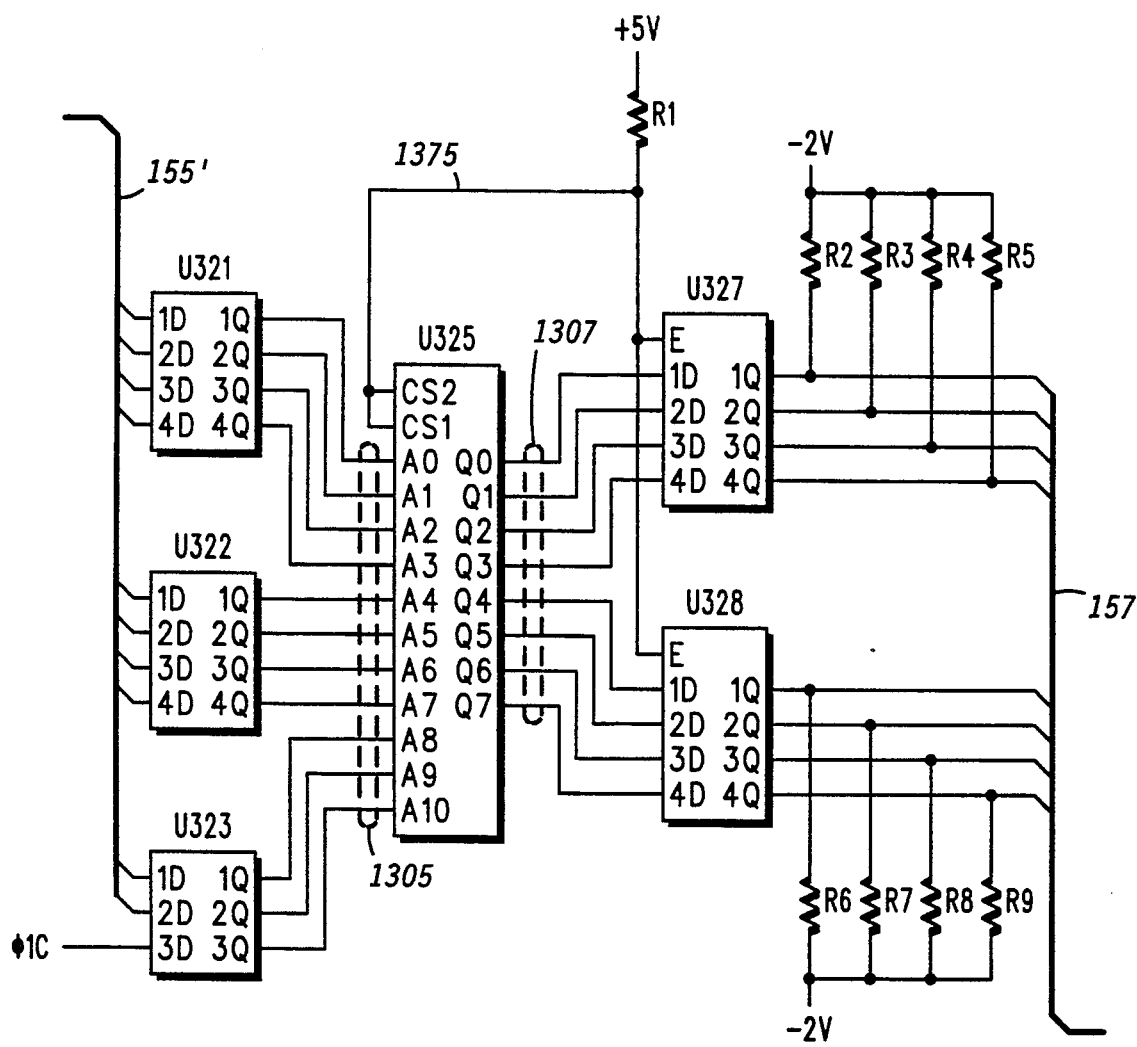
FIG. 13 is a schematic diagram of a non-volatile memory circuit in accordance with an embodiment of the present invention.
Figure 14:
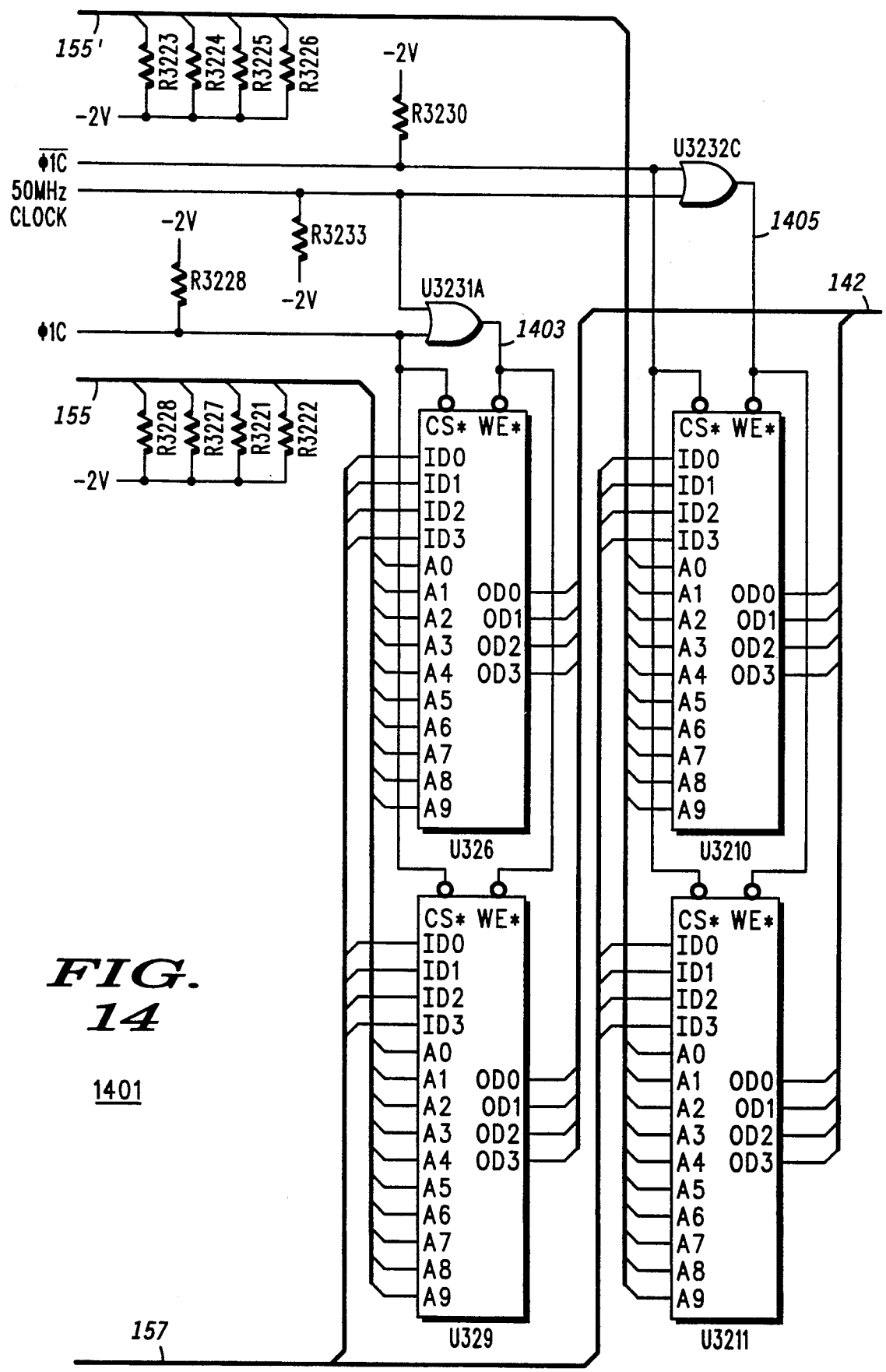
FIG. 14 is a schematic diagram of a high speed memory circuit in accordance with an embodiment of the present invention.

FIGS. 13 and 14 depict non-volatile memory circuit 1301 and high speed memory circuit 1401, respectively, which together comprise memory array 720 of FIG. 7.

FIG. 13 is a schematic diagram of non-volatile memory circuit 1301 in accordance with an embodiment of the present invention. Non-volatile memory circuit 1301 corresponds to non-volatile memory 159 of FIG. 4 and provides a non-volatile information store containing sensitivity time control threshold information.

Non-volatile memory circuit 1301 comprises digital busses 155', 157, 1305 and 1307, non-volatile memory U325, which is a 2K × 8 EPROM (electrically programmable read only memory, which may be erased prior to programming or re-programming by exposure to ultraviolet radiation) having TTL compatible inputs A0 through A10 and outputs Q0 through Q7. Non-volatile memory U325 is realized as a Type CY7C291A integrated circuit available from Cypress Semiconductor Corp., of San Jose, Calif.

Non-volatile memory circuit 1301 further comprises quad ECL-TTL converters U321, U322 and U323, which are Type 10125 integrated circuits for converting ECL-compatible input data therefrom to TTL-compatible output data and each having outputs 1Q through 4Q coupled to digital buss 1305. Digital buss 1305 is further coupled to inputs A0 through A10 of non-volatile memory U325 (output 4Q of quad ECL-TTL converter U323 is not used).

Quad ECL-TTL converters U321 and U322 each have inputs D1 through D4 coupled to digital buss 155' while quad ECL-TTL converter U323 has inputs D1 and D2 coupled to digital buss 155' and has input D3 coupled to clock signal $\phi$1C. Input D4 of quad ECL-TTL converter U323 is not used.

Non-volatile memory circuit 1301 further comprises quad TTL-ECL converters U327 and U328, which are Type 10124 integrated circuits each having inputs 1D through 4D coupled to outputs Q0 through Q7 of non-volatile memory U325 via digital buss 1307. Quad TTL-ECL converters U327 and U328 have outputs 1Q through 4Q coupled to digital buss 157. Quad TTL-ECL converters U327 and U328 convert output STC information describing threshold levels from non-volatile memory U325 from TTL levels to ECL levels.

R2 through R9, which are 100 Ω pull-down resistors, are coupled to digital buss 157. Pull-up resistor R1, which is a one kΩ resistor, is coupled to inputs CS1 and CS2 of non-volatile memory U325, to input E of quad TTL-ECL converter U327 and to input E of quad TTL-ECL converter U328 by line 1375.

Prior to a measurement, sequential address data are generated by address generator 715 of FIG. 12 and these sequential address data are passed via buss 155′ to U3210 and U3211 (FIG. 14, infra) and also to U325 by way of quad ECL-TTL converters U321, U322 and U323. Data from U325 are coupled to U3210 and U3211 by digital buss 157 and quad TTL-ECL converters U327 and U328. Thus, data stored in ROM U325 are loaded into high speed memory circuits U3210 and U3211 in response, for example, to a power-up condition.

FIG. 14 is a schematic diagram of high speed memory circuit 1401 in accordance with an embodiment of the present invention. High speed memory circuit 1401 comprises random access memory circuits U326, U329, U3210 and U3211 which are Type MBM 10474A 1K×8 (1024 bit by eight bit) static random access memory (SRAM) integrated circuits obtained from Fujitsu of San Jose, CA. High speed memory circuit 1401 corresponds to high speed digital memory 140 of FIG. 4. Random access memory circuits U326, U329, U3210 and U3211 have memory access times in the range of less than 3 nanoseconds, desirably in the range of less than 2.5 nanoseconds and preferably in the range of 2 nanoseconds.

Random access memory circuits U326 and U329 have address inputs A0 through A9 coupled to digital buss 155 and random access memory circuits U3210 and U3211 have address inputs A0 through A9 coupled to digital buss 155′. The lines corresponding to the lower four address bits of digital busses 155 and 155′ are coupled to R3221 through R3228, which are 50 Ω pull-down resistors.

Random access memory circuits U326, U329, U3210 and U3211 each have outputs OD0 through OD3 coupled to digital buss 142 and inputs ID0 through ID3 coupled to digital buss 157. Random access memory circuits U326 and U329 have inputs CS* coupled to line $\overline{\phi 1C}$ and inputs WE* coupled to line 1403. Line $\overline{\phi 1C}$ is also coupled to R3228, which is a 50 Ω pull-down resistor. Random access memory circuits U3210 and U3211 have inputs CS* coupled to line $\overline{\phi 1C}$ and inputs WE* coupled to line 1405. Line $\phi 1C$ is also coupled to R3230, which is a 50 Ω pull-down resistor.

Line $\overline{\phi 1C}$ is coupled to an input to OR/NOR gate U3232C while line $\phi 1C$ is coupled to an input to OR/NOR gate U3231A. OR/NOR gates U3232C and U3231A are Type 10105 integrated circuits. Each of OR/NOR gates U3232C and U3231A has a second input which is coupled to line 50 MHZ CLOCK and to R3233, which is a 50 Ω pull-down resistor. OR/NOR gate U3232C has a non-inverting output coupled to line 1405 while OR/NOR gate U3231A has a non-inverting output coupled to line 1403. Lines 1403 and 1405 supply appropriate clock signals to random access memory circuits U326, U329, U3210 and U3211.

Non-volatile memory circuit 1301 is only used during the interval following a resetting of the signals coupled via lines POR and $\overline{\text{POR}}$ and prior to the resetting of the signals coupled via lines PRELOAD COMPLETE and $\overline{\text{PRELOAD COMPLETE}}$.

Address data from memory address generator 715 of FIG. 7 are input to memory array 720 via digital busses 155 and 155′ and are coupled to non-volatile memory U325 via quad ECL-TTL converters U321, U322 and U323. STC information describing threshold levels are in turn produced by non-volatile memory U325 and are coupled to digital buss 157 via quad ECL-TTL converters U327 and U328. STC information describing threshold levels is then stored in random access memory circuits U326, U329, U3210 and U3211.

Following completion of data storage in random access memory circuits U326, U329, U3210 and U3211, circuit 700 is ready to cycle through an arbitrary number of measurement epochs.

During a measurement interval such as $T_1$ of FIGS. 1 and 6, STC information describing threshold levels stored in random access memory circuits U326, U329, U3210 and U3211 are selected by digital signals delivered via digital buss 137 from noise prelook 723 of FIG. 7. The selected STC information describing threshold levels, which correspond, for example, to values represented by the left hand edges of curves 510, 520 and 525 of FIG. 5, are delivered to target detection subsystem 730 via digital buss 142. STC information describing threshold levels corresponding to subsequent portions of the selected STC curve are then addressed by digital signals coupled by digital busses 155, 155′ from memory address generator 715 of FIG. 7.

Figure 15:
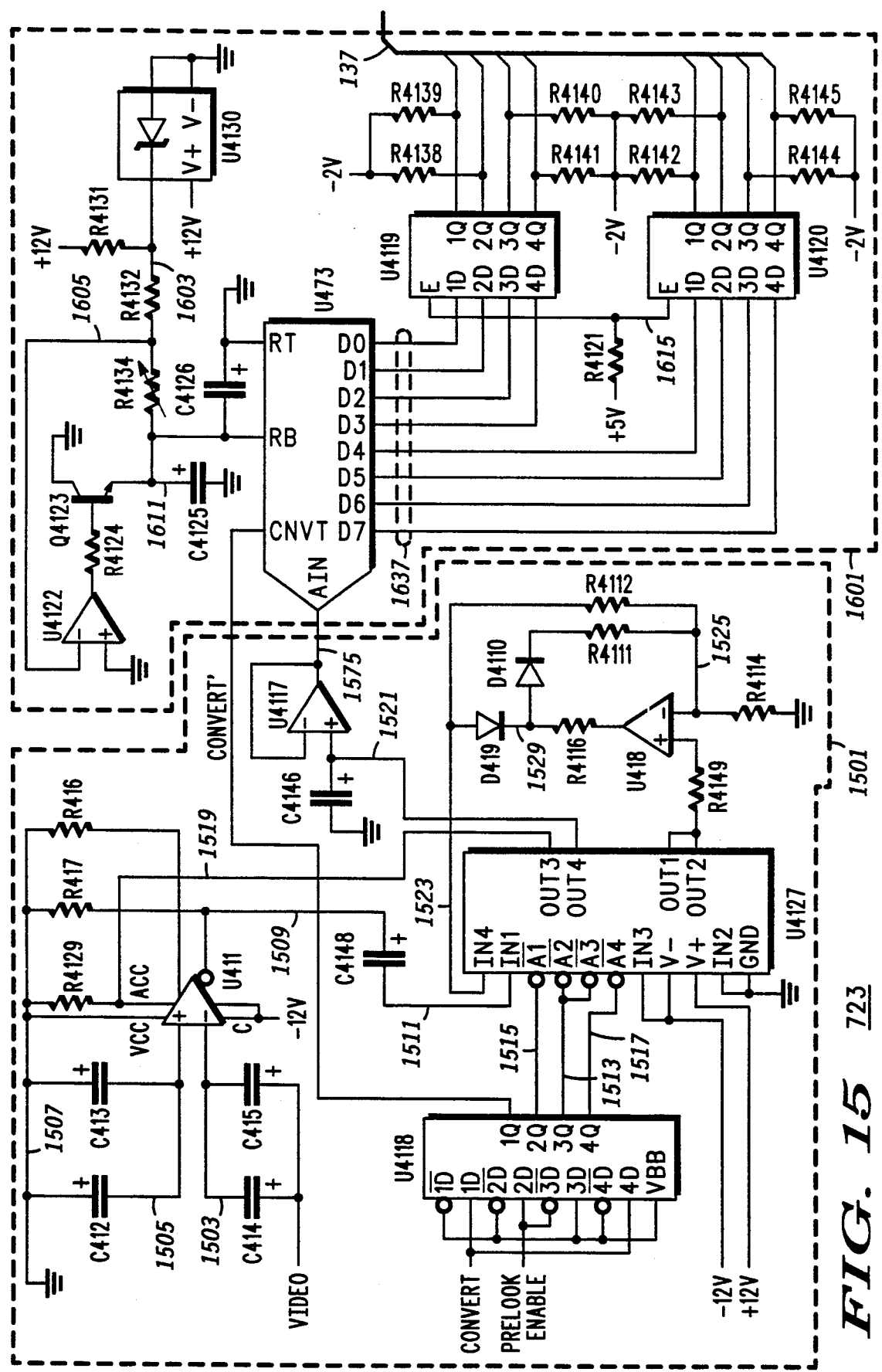
FIG. 15 is a schematic diagram of a sample and hold circuit and an analog-to-digital converter circuit in accordance with an embodiment of the present invention.

FIG. 15 depicts sample and hold circuit 1501 and analog-to-digital converter circuit 1601, respectively, which together comprise noise prelook 723 of FIG. 7. Noise prelook 723 corresponds to sampler and A/D converter 123 of FIGS. 3 and 4. Line VIDEO corresponds to line 120, line PRELOOK ENABLE corresponds to line 210 and line CONVERT corresponds to line 211.

FIG. 15 includes a schematic diagram of sample and hold circuit 1501 in accordance with an embodiment of the present invention. Sample and hold circuit 1501 is one realization of sample and hold 125 of FIG. 4, with input VIDEO corresponding to line 125, line PRELOOK ENABLE corresponding to line 210, line CONVERT corresponding to line 211 and line 1575 corresponding to line 130.

Sample and hold circuit 1501 comprises quad ECL-TTL converter U4118, differential amplifier U411, operational amplifiers U4117 and U418 and four pole single throw switch U4127, input lines CONVERT, PRELOOK ENABLE and VIDEO and output lines 1575 and CONVERT′.

Capacitors C414 and C415 are coupled in parallel between input line VIDEO and line 1503. Line 1503 is coupled to an inverting input of differential amplifier U411. Differential amplifier U411 is a type MC1580 differential amplifier integrated circuit. Line 1505 is coupled to a non-inverting input of differential amplifier U411. Capacitors C412 and C413 are coupled in parallel between line 1507 and line 1505. Capacitors C412 and C414 are 0.1 microFarad capacitors while capacitors C413 and C415 are 0.001 microFarad capacitors. Capacitors C412 through C415 are for AC coupling inputs of differential amplifier U411 as is well known in the art.

Line 1507 is coupled to R4129, which is a 4.7 kΩ resistor, and to R416 and R417, which are one kΩ resistors. R416 and R417 are coupled to noninverting and inverting outputs of differential amplifier U411. The inverting output of differential amplifier U411 is coupled to line 1509. Line 1509 is coupled to AC de-coupling capacitor C4148, which is a 0.1 microFarad capacitor. C4148 is coupled between input IN1 of four pole single throw switch U4127 and line 1509. Differential amplifier U411 thus acts as an inverting AC coupled amplifier to couple signals from line VIDEO to input IN11 of four pole single throw switch U4127.

Four pole single throw switch U4127 is a Type HI201HS integrated circuit. Input IN2 of four pole single throw switch U4127 is coupled to ground while outputs OUT1 and OUT2 are coupled via line 1520 to R4149, which is a one kΩ resistor. Input IN3 of four pole single throw switch U4127 is coupled to −12 Volts and output OUT3 is coupled to line 1519. Input IN4 of four pole single throw switch U4127 is coupled to line 1523 while output OUT4 is coupled to C4146, which is a 0.001 microFarad capacitor, and to line 1521.

Switching input A1 of four pole single throw switch U4127 is coupled to line 1515 and to output 2Q of quad ECL-TTL converter U4118. Switching inputs A2 and A3 of four pole single throw switch U4127 are coupled to line 1513 and to output 3Q of quad ECL-TTL converter U4118. Switching input A4 of four pole single throw switch U4127 is coupled to line 1517 and to output 4Q of quad ECL-TTL converter U4118.

Quad ECL-TTL converter U4118 is a Type 10125 integrated circuit. Quad ECL-TTL converter U4118 has inputs 1D and 4D coupled to line CONVERT and inputs 3D and 2D coupled to line PRELOOK ENABLE.

Switch 1 of four pole single throw switch U4127 thus operates in response to signals coupled via line PRELOOK ENABLE, while switches 2 and 3 operate in one sense and switch 4 in the opposite sense in response to signals coupled via line CONVERT. Output 1Q of quad ECL-TTL converter U4118 is coupled to line CONVERT', which provides TTL-compatible versions of signals coupled via line CONVERT.

Differential amplifier U418 is a Type HA2539 integrated circuit. Differential amplifier U418 has a noninverting input coupled via lines 1522 and 1520 and resistor R4149 to outputs OUT1 and OUT2 of four pole single throw switch U4127. When the signal coupled via line PRELOOK ENABLE becomes a logical "1", switch IN1 couples the noninverting input of differential amplifier U418 to the output of differential amplifier U411 and thus to signals coupled via line VIDEO. When the signal coupled via line PRELOOK ENABLE becomes a logical "0", the noninverting input of differential amplifier U418 is de-coupled from line VIDEO and is instead coupled to ground.

Differential amplifier U418 has an inverting input which is coupled to R4111, R4112 and R4114 via line 1525. R4111 and R4112 are 10 kΩ resistors while R4114 is a 1 kΩ resistor. R4111 is coupled to the cathode of diode D4110. R4112 is coupled to the anode of diode D419 and to line 1523. Diodes D4110 and D419 are conveniently Type IN5711 high speed diodes. Line 1523 is also coupled to input IN4 of diode D4110 and a cathode of diode D419 are coupled to line 1529 and to R4116, which is a 27 Ω resistor. R4116 couples an output of differential amplifier U418 to line 1529.

Differential amplifier U418, four pole single throw switch U4127, diodes D419 and D4110, capacitor C4146 and ancillary resistors as described hereinabove thus form a sample and hold circuit operating to sample and maintain voltages corresponding to peak values of signals coupled via line VIDEO on capacitor C4146 in response to control signals coupled via lines PRELOOK ENABLE and CONVERT.

Line 1575 is coupled to an output of differential amplifier U4117 and to an inverting input thereof, thus forming a noninverting buffer amplifier as is well known in the art. Line 1521 is coupled to a noninverting input of differential amplifier U4117. The voltage maintained by capacitor C4146 is thus coupled to line 1575.

Sample and hold circuit 1501 thus acts to detect and maintain samples of analog input signals coupled via line VIDEO in response to digital control signals coupled via lines PRELOOK ENABLE and CONVERT.

FIG. 15 also includes a schematic diagram of analog-to-digital converter circuit 1601 in accordance with an embodiment of the present invention. Analog-to-digital converter circuit 1601 comprises voltage reference U4130, differential amplifier U4122, npn transistor Q4123, analog-to-digital converter integrated circuit U473 and quad TTL-ECL converters U4119 and U4120, together with resistors R4131, R4132, R4134, R4124, R4121 and R4138 through R4145, capacitors C4125 and C4126 and digital busses 137 and 1637.

Voltage reference U4130 is a Type LM399 6.95 Volt voltage reference integrated circuit available from National Semiconductor of Santa Clara, CA. Voltage reference U4130 is coupled to ground, +12 Volts and to line 1603. Line 1603 is coupled to R4131, which is a 6.9 kΩ resistor. R4131 is coupled between +12 Volts and line 1603. R4134, which is a 10 kΩ adjustable resistor, and R4132, which is a 22 kΩ resistor, are also coupled to line 1603. R4132 is coupled between lines 1603 and 1605. R4134 is coupled between an inverting input (line 1605) to differential amplifier U4122 and line 1611.

Differential amplifier U4122 is a Type OP37 operational amplifier integrated circuit. A noninverting input to differential amplifier U4122 is coupled to ground. R4124 is a 100 Ω resistor which is coupled to an output of differential amplifier U4122. R4124 is also coupled to a base of npn transistor Q4123.

Npn transistor Q4123 is a Type 2N2222A transistor. Q4123 has a collector which is coupled to ground and has an emitter which is coupled to line 1611 and to R4134. C4125, which is a 1.0 microFarad capacitor, is coupled between the emitter and ground. Line 1611 is also coupled to input RB of digital-to-analog converter integrated circuit U473. Voltage reference U4130, npn transistor Q4123 and differential amplifier U4122 form a voltage reference circuit which provides a known, adjustable reference voltage to analog-to-digital converter integrated circuit U473.

Analog-to-digital converter integrated circuit U473 is a Type AD 9048 analog-to-digital converter integrated circuit obtained from Analog Devices of Norwood, Mass., and corresponds to analog-to-digital converter 135 of FIG. 4. Analog-to-digital converter integrated circuit U473 has analog input AIN which is coupled to line 1575 (sample and hold circuit 1501), input CNVT, which is coupled to line CONVERT' (see FIG. 15) and digital outputs D0 through D7, which are coupled to digital buss 1637.

Digital buss 1637 is coupled to inputs 1D through 4D of quad TTL-ECL converter integrated circuits U4119 and U4120, which are Type 10124 integrated circuits. Quad TTL-ECL converter integrated circuits U4119 and U4120 each have outputs Q1 through Q4 which are coupled to digital buss 137 and also to R4138 through R4145, which are 100 Ω pull-down resistors.

Analog-to-digital converter integrated circuit U473 and quad TTL-ECL converter integrated circuits U4119 and U4120 cooperate to provide an ECL-compatible digital output signal on digital buss 137 which is a digital representation of an analog voltage value (line 1575), in response to digital control signals coupled via line CONVERT'.

Figure 16:
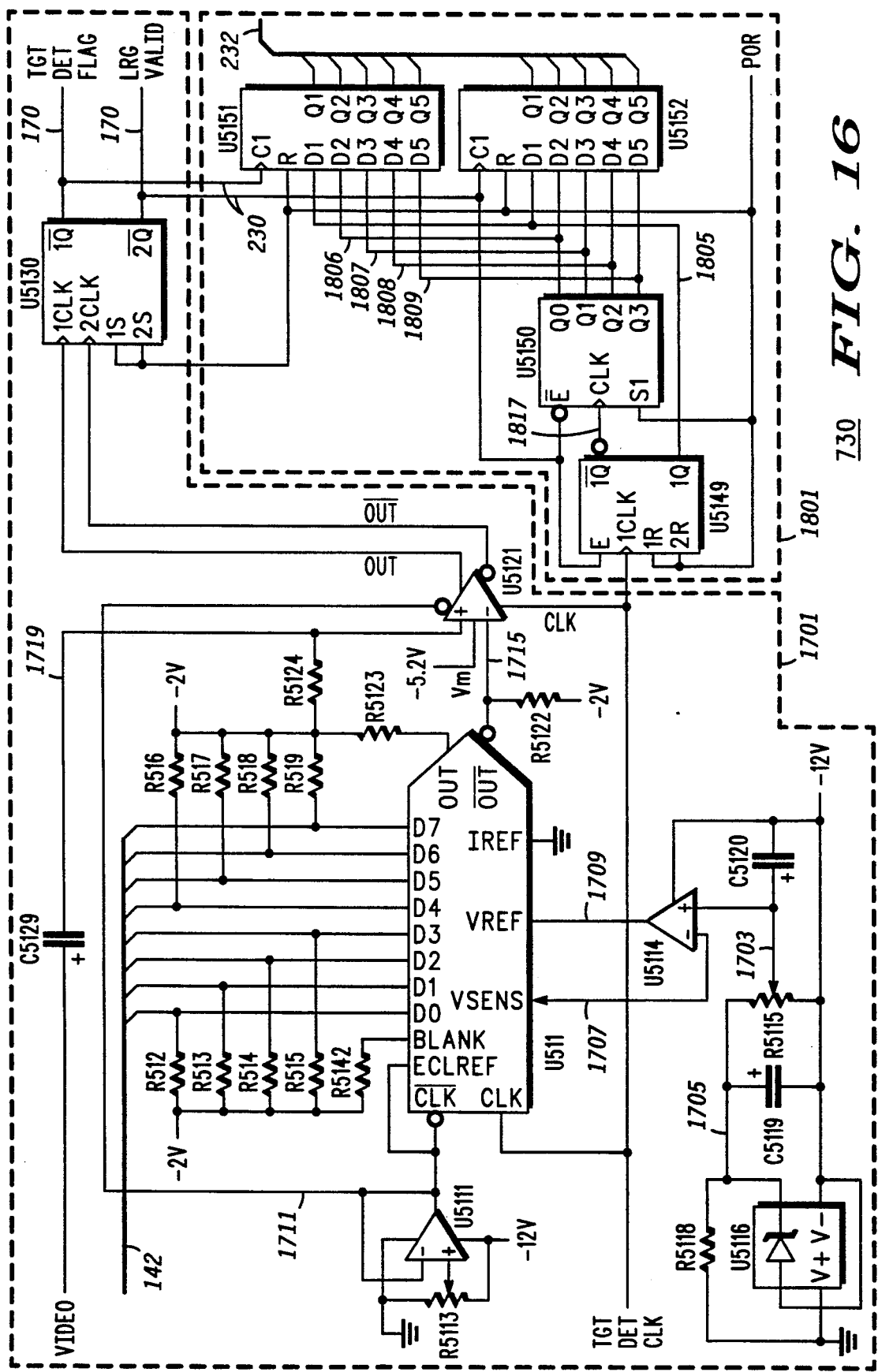
FIG. 16 is a schematic diagram of a high speed comparator circuit and a time/range gate latch circuit in accordance with an embodiment of the present invention.

FIG. 16 includes a schematic diagram of high speed comparator circuit 1701 and time/range gate latch circuit 1801, which together comprise target detection subsystem 730 of FIG. 7, in accordance with an embodiment of the present invention.

High speed comparator circuit 1701 comprises differential amplifiers U5111, U5114, voltage reference U5116, digital-to-analog converter integrated circuit U511, high speed comparator integrated circuit U5121 and dual MS flip flop U5130 together with input/output leads POR, TGT DET CLOCK, VIDEO, TGT DET FLAG and LRG VALID and digital buss 142. Leads TGT DET FLAG and LRG VALID correspond to digital buss 170 of FIGS. 3 and 4.

Differential amplifiers U5114 and U5111 are Type OP37 operational amplifier circuits. Differential amplifier U5114 has an inverting input coupled to output VSENSE and an output coupled to input VREF of digital-to-analog converter integrated circuit U511 via lines 1707 and 1709, respectively. Differential amplifier U5114 has a non-inverting input coupled to line 1703 and to C5120, which is a 0.1 microFarad capacitor. C5120 is coupled between −12 Volts and line 1703.

Line 1703 is also coupled to the wiper of potentiometer R5115, which is a 20 kΩ potentiometer. R5115 is coupled between −12 Volts and line 1705. C5119, which is a 0.1 microFarad capacitor, is also coupled between line 1705 and −12 Volts. Voltage reference U5116 is coupled to line 1705, −12 Volts and ground. Voltage reference U51116 is a Type LM399 6.95 Volt voltage reference integrated circuit (described supra). Resistor R5118, which is a 6.8 kΩ resistor, is coupled between line 1705 and ground.

Differential amplifier U5114 and ancillary components provide a stable adjustable reference voltage to digital-to-analog converter integrated circuit U511 via line 1709.

Differential amplifier U5111 has an inverting input and an output coupled to line 1711 to form a noninverting buffer amplifier, as is well known in the art. Differential amplifier U5111 has a noninverting input which is coupled to the wiper of potentiometer R5113, which is a 5 kΩ potentiometer. R5113 is also coupled to −12 Volts and to ground. R5113 is set to provide an ECL reference voltage level at the wiper thereof, which ECL reference voltage level is reproduced and coupled to other circuit elements via line 1711. Line 1711 is coupled to inputs $\overline{CLK}$ and ECLREF of digital-to-analog converter integrated circuit U511 and to input CLK of high speed comparator integrated circuit U5121. Differential amplifier U5111 and ancillary circuitry thus form an ECL reference voltage generation circuit and supply an ECL reference voltage via line 1711.

Digital-to-analog converter integrated circuit U511 is a Type SP98608 digital-to-analog converter manufactured by Plessy of Irvine, Calif., and corresponds to digital-to-analog converter 145 of FIG. 4. Digital-to-analog converter integrated circuit U511 has input CLK coupled to line TGT DET CLOCK, input IREF coupled to ground, and inputs D0 through D7 coupled to digital buss 142. Digital buss 142 is coupled to R512 through R519, which are 50 Ω pull-down resistors. Digital buss 142 supplies digital STC values from memory array 720 of FIG. 7 to digital-to-analog converter integrated circuit U511. Digital-to-analog converter integrated circuit U511 has outputs OUT and $\overline{OUT}$ coupled to R5123 and R5122, respectively. R5122 and R5123 are 50 Ω pull-down resistors. Output OUT is also coupled to line 1715. Line 1715 corresponds to line 160 of FIGS. 3 and 4.

Digital-to-analog converter integrated circuit U511 converts digital STC values delivered from memory array 720 of FIG. 7 to analog voltage values which are coupled to line 1715.

Line 1715 is coupled to an inverting input of high speed comparator integrated circuit U5121. High speed comparator integrated circuit U5121 is a Type MC10116 integrated circuit obtained from Motorola, Inc. of Phoenix, Ariz., and corresponds to threshold detector 166 of FIG. 3 and comparator 165 of FIG. 4. High speed comparator integrated circuit U5121 has a noninverting input which is coupled to R5124, which is a 50 Ω pull-down resistor, and to line 1719. Line 1719 is coupled to C5120, which is a 0.001 microFarad coupling capacitor. C5120 couples line 1719 to input line VIDEO.

High speed comparator integrated circuit U5121 has complementary outputs which are coupled to inputs 1CLK and 2CLK of dual MS flip flop U5130, respectively, via lines OUT and $\overline{OUT}$, respectively. Dual MS flip flop U5130 has inputs 1S and 2S coupled to line POR, and outputs 1Q and 2Q coupled to lines TGT DET FLAG and LRG VALID. Dual MS flip flop U5130 converts analog output signals from high speed comparator integrated circuit U5121 to ECL signal levels. Lines TGT DET FLAG and LRG VALID correspond to line 170 of FIGS. 3 and 4.

Dual MS flip flop U5130 is a Type 10131 flip flop. High speed comparator integrated circuit U5121 compares AC signals coupled via line VIDEO to analog STC information describing threshold levels from digital-to-analog converter integrated circuit U511 (line 1715) to provide signals coupled via lines OUT and $\overline{OUT}$ which indicate which of the input signals is larger. When the input signal coupled via line 1717 exceeds the analog STC threshold level coupled via line 1715, the presence of a target is indicated and output signals are coupled to lines TGT DET FLAG and LRG VALID.

High speed comparator circuit 1701 converts digital data coupled from memory array 720 of FIG. 7 via digital buss 142 to analog STC information describing threshold levels and compares digitally generated analog STC information describing threshold levels to analog input signals coupled via line VIDEO to provide ECL-compatible digital output signals which indicate the relative magnitude of the analog STC information describing threshold levels to the analog input signals in response to digital input signals. The ECL-compatible output signals indicate whether or not a valid target was detected.

FIG. 16 also provides a schematic diagram of time/range gate latch circuit 1801 in accordance with an embodiment of the present invention. Time/range gate latch circuit 1801 corresponds to time/range gate latches 225 of FIG. 4.

Time/range gate latch circuit 1801 comprises dual MS flip-flop U5149, which is a Type 10131 dual MS flip-flop integrated circuit, up/down counter U5150, which is a Type 10136 up/down counter integrated circuit and HEX D MS flip-flops U5151 and U5152, which are Type 10186 HEX D MS flip-flop integrated circuits, together with digital busses 230 and 232, ancillary interconnective lines and input lines POR and TGT DET CLOCK.

Dual MS flip-flop U5149 has inputs 1R and 2R coupled to line POR, input 1CLK coupled to line TGT DET CLOCK, input E coupled to line LRG VALID and outputs 1Q and $\overline{1Q}$ coupled to lines 1805 and 1817, respectively. Line 1805 is also coupled to inputs D1 of HEX D MS flip-flops U5151 and U5152.

Up/down counter U5150 has input S1 coupled to line POR and input E coupled to line LRG VALID. Up/down counter U5150 has input CLK coupled via line 1817 to output $\overline{1Q}$ of dual MS flip-flop U5149. Up/down counter U5150 has outputs Q0 through Q3 coupled to inputs D2 through D5 of HEX D MS flip-flops U5151 and U5152 via lines 1806 through 1809.

HEX D MS flip-flops U5151 and U5152 have inputs R coupled to line POR. HEX D MS flip-flop U5151 has input C1 coupled to TGT DET FLAG while HEX D MS flip-flop U5152 has input C1 coupled to line LRG VALID. HEX D MS flip-flops U5151 and U5152 have outputs Q1 through Q6 coupled to digital buss 232.

Following time $T_0$ of FIGS. 1, 6 and/or 11, dual MS flip-flop U5149 and up/down counter U5150 are clocked by the gated 100 MegaHertz clocking signal coupled via line TGT DET CLOCK, causing the signals coupled via lines 1805 through 1809 to increment in value. When a target is indicated by a change in status of the signals coupled via lines TGT DET FLAG and LRG VALID, HEX D MS flip-flop U5151 is clocked, transferring the value coupled via lines 1805 through 1809 to digital buss 232.

When a subsequent change in status of the signals coupled via lines TGT DET FLAG and LRG VALID occurs, HEX D MS flip-flop U5152 is clocked, transferring another value coupled via lines 1805 through 1809 to digital buss 232. The values transferred to digital buss 232 correspond to the times at which the change in status of the signals coupled via lines TGT DET FLAG and LRG VALID occurred. The difference between these values represents the duration of the interval between status changes or the length of the reflecting object along the direction of propagation of the transmitted pulse.

Clock generation and distribution circuit 705, master timing generator 710, memory address generator 715, memory array 720, noise prelook 723 and target detection subsystem 730 thus cooperate to first load digital STC information describing threshold levels into high speed memory integrated circuits U326, U329, U3210 and U3211 within memory array 720 and then to process signals coupled via line VIDEO to detect return echo signals and thus to measure ranges to reflecting objects.

These elements are advantageously employed with a lidar, that is, a light detection and ranging, sensitivity time control device. In lidar apparatus, an optical signal is launched by firing a light-emitting device such as, by way of example, a solid state laser. The delay from firing the light-emitting device until reception of an optical return signal is measured. This measured delay represents a measure of the distance to the object from which the return signal is reflected.

FIG. 17 is a drawing of oscilloscope traces in arbitrary linear units versus time in nanoseconds of measured signal amplitudes for the apparatus of FIG. 4 in accordance with the present invention. The ordinate of FIG. 17 is calibrated in arbitrary linear units while the abscissa is calibrated at 20 nanoseconds per division.

A measurement epoch comprising intervals $T_{CAL}$ and $T_1$ begins with time $T_B$ and ends with time $T_E$. The laser fire signal (corresponding to zero range) occurs at or near time $T_0$ and the measurement interval denoted by $T_1$ concludes at time $T_E$. Time $T_E$ also corresponds to the earliest time when a subsequent measurement epoch may begin. Pre-look interval $T_{CAL}$ immediately precedes time $T_0$.

FIG. 17 illustrates measured return signal amplitude 1985, STC threshold level 1980 and comparator output signal 1990 showing target acquisition signal 1995. Target acquisition signal 1995 corresponds to target detection at a range of circa fifteen feet. FIG. 17 clearly shows that a recognizable target recognition signal is produced by apparatus 100 of FIG. 4.

D. AEROSOL DETECTION CIRCUIT

FIG. 18 is a graph of calculated return signal amplitudes for targets and/or aerosols in accordance with the present invention. FIG. 18 comprises graphs of calculated return signal levels versus time for an aerosol alone (curve 2020) and a target in the absence of an aerosol (curve 2030). Curve 2020 represents the background signal caused by light diffusely reflected by an aerosol.

Curve 2020 differs substantially from curves 530 and 540 of FIG. 6, showing that modelling of background signal levels and hence the STC threshold levels required from STC generator 138 of FIG. 4 are very different for cases where aerosols such as smoke, fog, mist, dust, clouds, et cetera, are present.

As such, STC threshold levels suitable for discriminating targets from light scattered by an aerosol with maximum dynamic range will have different characteristics than STC threshold levels suited to the bright background and clear air scenarios. Also, the return signal from an aerosol can be analyzed to determine (1) the presence of an aerosol and (2) to select STC criteria which allow discrimination of a target return signal from the aerosol return signal.

The data of curve 2030 show that a target return signal in the absence of aerosols may have substantially the same peak amplitude as return signals from aerosols alone (curve 2020). Comparison of curves 2020 and 2030 shows that return signals from targets alone (curve 2030) have much more high frequency content (i.e., shorter time durations) than return signals from aerosols alone (curve 2020), allowing discrimination between these two types of return signals based on their spectral content.

FIG. 19 shows a simplified schematic diagram of circuit 701, which is a two-channel example of a circuit for detecting the presence of an aerosol in accordance with the present invention. It will be appreciated by those skilled in the art that circuit 701 can be readily adapted to an arbitrary number of channels, however, a pair of channels are illustrated in FIG. 19 for simplicity and ease of explanation.

Circuit 701 comprises first channel CH1, second channel CH2 and input selector 103. Input selector 103 comprises multiple analog inputs 105 and analog multiplexing switch 110 coupled to digital timing and control circuitry (not shown in FIG. 19) by lead 210. The operation of input selector 103 is described in the text relevant to FIG. 4, supra.

CH1 comprises comparator 165 having output on lead 170. Comparator 165 has inputs coupled to attenuator 705' via lead 160' and to input selector 103 via lead 115. Attenuator 705' comprises, by way of example, resistors 707' and 709'.

CH2 comprises comparator 165" having output on lead 170". Comparator 165" has inputs coupled to attenuator 705" via lead 160" and to lowpass filter 715' via lead 115". Lowpass filter 715' is coupled to input selector 103 via lead 115. Attenuator 705" comprises, by way of example, resistors 707" and 709".

Comparator 165" of CH2 is coupled to digital-to-analog converter 145 by leads 160 and 160" and voltage divider 705". Comparator 165" is coupled to input selector 103 by leads 115 and 115" and filter 715'. Attenuators 705' and 705" are coupled to digital-to-analog converter 145 via lead 160. Circuit 701 corresponds to circuit 301 of FIG. 4.

Attenuators 705' and 705" operate by dividing voltage $V_{STC}$ on lead 160 by voltage $V_{OUT}$ on leads 160' and 160" to provide an attenuation G in accordance with $G = V_{OUT}/V_{STC} = (R_2/(R_1+R_2))$, where $R_2$ corresponds, by way of example, to resistor 709' or 709" and $R_1$ corresponds to resistor 707' or 707" Many ways of providing attenuators such as 705', 705" are well known in the art.

Circuit 701 operates by having two independent channels CH1 and CH2 having different bandwidths B and different STC threshold gains or attenuations G such that the probability of detecting thermal noise is the same for both channels. This relationship can be expressed as:

$$(B_{CH1}/B_{CH2})^{0.5} = G_{CH1}/G_{CH2}, \quad (1)$$

where the subscripts CH1 and CH2 refer to channels 1 and 2, respectively, G represents the channel amplitude (e.g., voltage or current) gain and/or attenuation and B represents the channel bandwidth.

Return signals having characteristics such as shown by curve 2020 of FIG. 18 have markedly more low frequency content than do those such as shown by curve 2030. When $B_{CH1} > B_{CH2}$ and $G_{CH1} > G_{CH2}$ (i.e., when the STC threshold level to channel 1 has less attenuation or more gain than that to channel 2), channel 2 provides an output signal indicating presence of a reflecting body while channel 1 does not, for signals having the characteristics shown by curve 2020 of FIG. 18. This situation indicates that an aerosol condition exists and output 170" provides signals allowing an external processor (not shown) to select STC information describing threshold levels from non-volatile memory 159 and which are presently loaded into memory 140 of FIG. 4 corresponding to an aerosol scenario.

When both channels 1 and 2 provide valid target indication output signals, either an aerosol and/or a target is indicated. These latter two conditions may be differentiated by supplying STC information describing threshold levels corresponding to increasingly dense aerosols to comparators 165 and 165". If the channel 1 signal on lead 170 changes state (i.e., no longer provides an output signal), a target is indicated. If the channel 2 signal on lead 170' changes state (i.e., no longer provides an output signal), no target is indicated.

Alternatively, when both channels 1 and 2 provide valid target indication signals, a target may be alongside and may remain at a constant distance from the lidar. Thus, it may be both difficult and unnecessary to reset the threshold level to attempt to discriminate between aerosol and valid target indication output signals and the desired course of action is a complicated function of signal level and signal history (from prior measurement intervals) in addition to signal to threshold comparison information. This scenario is resolved by an external processor (not shown).

When only channel 2 provides a valid output signal, an aerosol is indicated. When neither channel provides a valid output signal, neither an aerosol or a target is indicated. These possible output states are summarized below in Table I.

TABLE I

|  |  | CHANNEL 2 0 | CHANNEL 2 1 |
|---|---|---|---|
| CHANNEL 1 | 0 | NEITHER TARGET NOR AEROSOL | AEROSOL ONLY |
| CHANNEL 1 | 1 | NOISE | AEROSOL OR TARGET |

E. AEROSOL DETECTION METHOD

Figure 20:
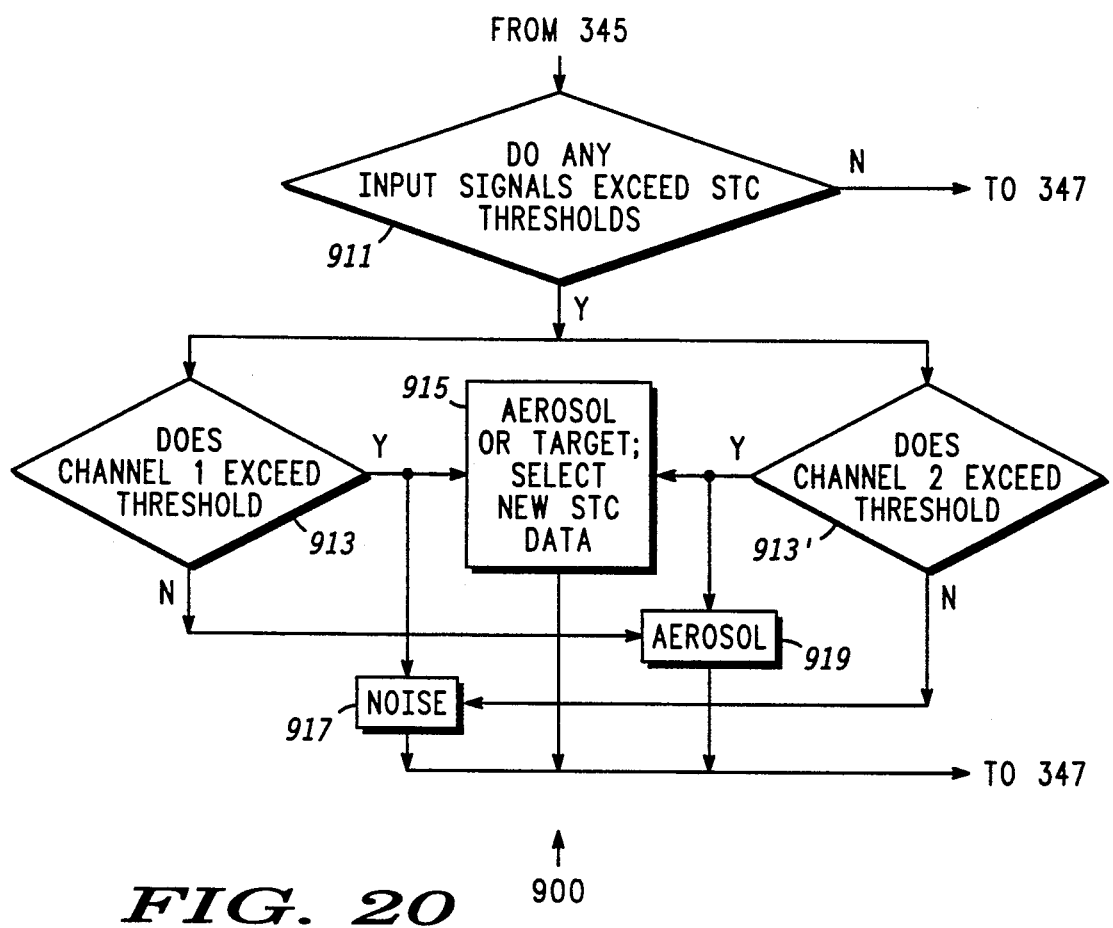
FIG. 20 is a flow diagram of a method for discriminating between a valid target return signal and an aerosol return signal in accordance with the present invention.

FIG. 20 is a flow diagram of method 900 for discriminating between a valid target return signal and an aerosol return signal in accordance with the present invention. It will be appreciated by those skilled in the art that method 900 can be readily adapted to an arbitrary number of channels, however, only a pair of channels are considered in method 900 of FIG. 20 for simplicity and ease of explanation. Method 900 comprises the steps of testing (blocks 911, 913, 913') a receiver signal which is split between n channels, wherein each channel has a distinct gain and bandwidth.

The STC threshold attenuations $G_n$ and bandwiths $B_n$ of each of n channels are chosen to provide the same probability of a false detection signal due to noise having a flat spectral distribution, known as white noise, such as thermal (Johnson) noise, in accordance with:

$$(B_n)^{0.5}/G_n = K, \quad (2)$$

where K is a constant. K is conveniently chosen to be in the range of one to ten billion (i.e., $1 < K < 10^{10}$) per square root Hertz and is preferably about ten million per square root Hertz. Output signals from each of the channels are compared to STC threshold levels differing in accordance with Eq. 2 (block 911) to determine if any input signals exceed STC threshold values.

The threshold detector determines if any channel is providing a valid output signal indicating that the received signal amplitude in that channel exceeded the STC threshold level and this information is made available to a digital processor (not shown). If no valid output signal is present, method 900 returns to step 347 of method 300 (see FIG. 5). If one or more valid output signals are present, comparator output signals from leads 170 and 170' of FIG. 19 are tested (blocks 913, 913') to determine which channels provide valid output signals.

When both the broadband (e.g., CH1 of FIG. 19) and the narrowband (e.g., CH2) channels indicate valid output signals, control passes to block 915. Either an aerosol or a target is indicated. New STC information describing threshold levels corresponding to a higher threshold are selected in high speed digital memory 140 and control passes to block 347 of FIG. 5.

When only the broadband channel(s) provide valid output signals, noise within apparatus 100 is indicated (block 917) and control again passes to block 347 of FIG. 5. When only the narrowband (i.e., lowpass) channel(s) yield valid output signals, aerosol is indicated (block 919) due to noise and control passes to block 347 of FIG. 5.

Method 900 thus discriminates between aerosol and target conditions based on spectral analysis of return signal characteristics.

F. EXAMPLE II

Figure 21:
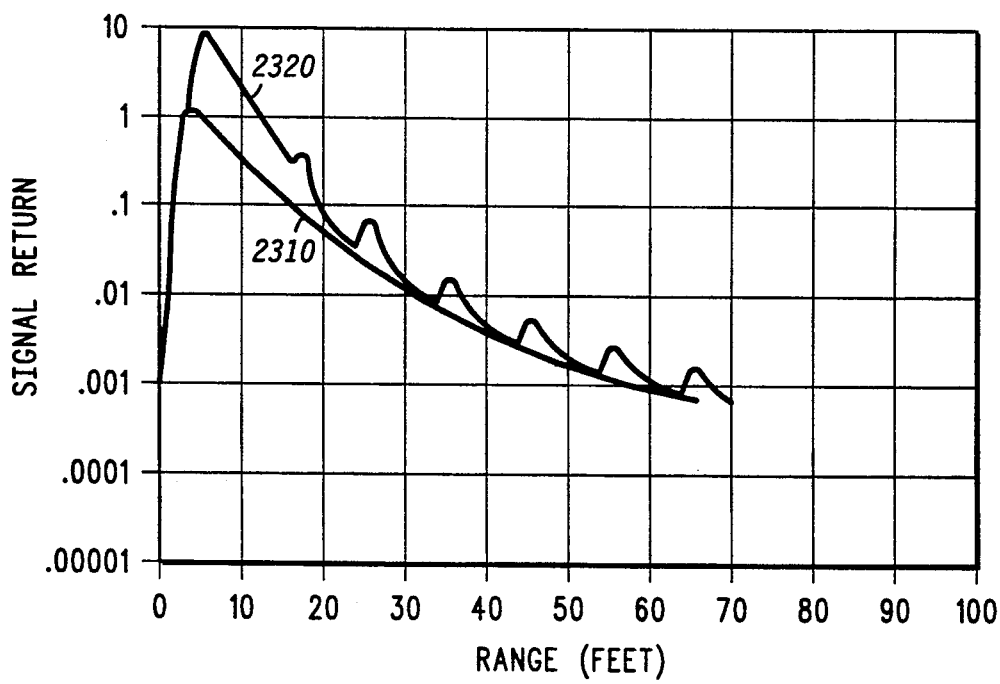
FIG. 21 illustrates calculated signal return amplitudes versus range in feet for the apparatus of FIG. 4 in accordance with the present invention.

FIG. 21 illustrates calculated signal return amplitudes versus range in feet for the apparatus of FIGS. 4 and 19 in accordance with the present invention. The calculations for FIG. 21 assume an aerosol extinction coefficient of 49.25 kilometers$^{-1}$, providing a visibility range of 61 meters. Other assumed parameter values are an optical pulse width of 5 nanoseconds, target reflectances of 0.05 and targets of one meter diameter. Targets are assumed at ranges of five, fifteen, twenty-five, thirty-five, forty-five, fifty-five and sixty-five feet from the transmitter.

Curve 2310 represents the calculated return signal amplitude for an aerosol alone while curve 2320 represents the calculated return signal amplitude for targets in the presence of the aerosol. An STC threshold level above curve 2310 allows the presence of any of the simulated targets to be detected, whether alone or in combination with one another.

A conventional lidar employing all digital signal processing and operating at a pulse repetition rate of 10 kiloHertz requires a digital processor capable of reducing 6 Megabytes of data per second while one operating at 100 kHz requires digital processing of 60 Megabytes of data per second.

The reduction in data handling capacity (or throughput) which the present approach makes possible is directly proportional to the number of time intervals which the time $T_1$ is divided into (horizontal portions of curve 54 of FIG. 1) divided by the two data items produced during each measurement interval.

For example, if time $T_1$ is 100 nanoseconds and twenty five intervals are used, about 32 megabytes/second must be processed using prior art techniques while the present approach only requires 2.72 megabytes/second in the worst case. If the number of samples per interval is increased by increasing the resolution and/or the measurement duration, the data rate reduction is accordingly improved in direct proportion thereto.

The present invention provides precise target discrimination at a 100 kiloHertz pulse repetition rate without requiring a 60 MegaHertz digital data rate. A data rate of less than 6 MegaHertz was used in the example of section C.

Further, 6 to 12 deciBells of improvement in post-detection signal-to-noise ratio is possible without requiring additional digital processors. This is because the comparison is rapidly made via the simplicity of analog circuits employing precise analog STC information describing threshold levels generated from digitally stored STC information describing threshold levels.

The high repetition rate of the present invention is achieved without the significant dynamic range sacrifice normally associated with all-analog approaches, while retaining the programmable flexibility of adjusting the time-varying sensitivity time control thresholds to allow correction for varying luminance and ambient conditions (e.g., bright background, aerosol, clear air, presence of chaff, et cetera).

A particular advantage of the present invention is that the analog-to-digital converter circuit need only operate at the pulse repetition rate used by the pulse-echo measurement apparatus.

The digital-to-analog converter operates at the digital data rate, which is substantially greater than the pulse repetition rate. This is a very important advantage because high speed digital-to-analog converter circuits are much more readily realized than are high speed analog-to-digital converter circuits.

A further advantage of the present invention is that the calibration data stored in the non-volatile memory can be easily reprogrammed by exchanging non-volatile memory modules or re-programming the existing non-volatile memory.

Also, the calibration data (i.e., the STC threshold level) stored in the high speed digital memory can be changed at any time by loading new data into the high speed memory from the non-volatile memory.

The high speed digital memory provides rapid generation of complex STC curves without requiring high A/D data rates, while the use of a ROM or EPROM for storing multiple STC curves which are downloadable to the high speed memory.

Alternatively, the use of a high speed ROM, allows the apparatus to respond to a much wider variety of ambient conditions and targets than is possible with prior art approaches operating at comparable data rates.

The data rate improvement realized by this technique is directly proportional to the number of data points comprising the measurement interval.

The present invention allows ready and extremely rapid reprogramming of STC generator 138 of FIG. 4 to achieve arbitrary sensitivity time control waveforms or signals having great precision over the full time/range required.

The present invention finds ready and useful application to such diverse applications as lidar apparatus for fuzing of ordinance, collision avoidance apparatus, ultrasonic medical imaging and nondestructive testing equipment and also for calibration of time domain measurement apparatus, such as time domain reflectometers and seismic mapping apparatus.

The present invention further achieves sensitivity time control at baseband rather than at radio frequencies, allowing use of compact, lightweight, simple and efficient analog and digital hardware for realization of the sensitivity time control threshold function.

A calibration or measurement circuit and method have been described which overcome specific problems and accomplish certain advantages relative to prior art methods and mechanisms. The improvements over known technology are significant. The complexities and high throughput processing requirements of all-digital signal processors are avoided, without sacrifice of programmability, speed of reprogramming or dynamic range.

Similarly, the ability to provide wide dynamic range target signature recognition in high repetition rate ranging apparatus operating under varying environmental conditions has been retained in a simple and rugged hardware realization.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

I claim:

1. A method for processing signals, the method comprising steps of:
    receiving an input signal;
    providing a non-volatile information store having therein desired sensitivity time control threshold information;
    extracting specific values of the desired sensitivity time control threshold information at successive time intervals to provide specific successive values of the desired sensitivity time control threshold information;
    converting the specific successive values of the desired sensitivity time control threshold information to analog values to provide an analog calibration signal; and
    comparing the analog calibration signal to a present input signal to provide a comparison signal.

2. The method of claim 1, wherein said converting step further comprises a step of converting the desired sensitivity time control threshold information with a digital-to-analog converter to provide the analog calibration signal.

3. The method of claim 1, wherein there are further included steps of:
    loading an addressable memory with digital calibration data from the non-volatile information store in response to signals from a digital control and timing generator; and
    extracting the specific successive values of the desired sensitivity time control threshold information from the addressable memory at successive time intervals to provide the specific successive values of the desired sensitivity time control threshold information.

4. The method of claim 1, wherein there are further included steps of:
    filtering the input signal to provide a narrowband input signal and a broadband input signal;
    attenuating the analog calibration signal to provide analog calibration signals having differing signal levels;
    comparing the narrowband and broadband input signals to the analog calibration signals having differing signal levels to provide a plurality of comparison signals; and
    testing the plurality of comparison signals.

5. The method of claim 3, wherein said extracting step further includes steps of:
    sampling the input signal to form an analog calibration estimate;
    storing the analog calibration estimate;
    converting the analog calibration estimate to a digital value;
    supplying the digital value to the addressable memory; and
    selecting the specific values of the desired sensitivity time control threshold information from the addressable memory based on the digital value.

6. The method of claim 3, wherein said addressable memory comprises a digital addressable memory.

7. An apparatus, comprising:
    a signal input for receiving input signals;
    sampling and analog-to-digital conversion means coupled to said signal input, said sampling and analog-to-digital conversion means for forming a digital pre-look signal from an input signal;
    digital memory means coupled to said sampling and analog-to-digital conversion means, said digital memory means storing sensitivity time control data and providing specific sensitivity time control data in response to said digital pre-look signal;
    digital-to-analog conversion means coupled to said digital memory means, said digital-to-analog conversion means for converting said specific sensitivity time control data to a first analog sensitivity time control signal; and
    first comparator means coupled to said signal input and to said digital-to-analog conversion means, said first comparator means having an input for receiving said first analog sensitivity time control signal, said first comparator means for comparing a present input signal to said first analog sensitivity time control signal to provide a first detection signal.

8. The apparatus as claimed in claim 7, wherein said digital memory means comprises a non-volatile memory means and a high speed addressable memory means.

9. The apparatus as claimed in claim 8, further comprising:
    a digital control and timing generator for providing control and clocking signals, said digital control and timing generator coupled to said digital memory means, to said sampling and analog-to-digital conversion means and to said digital-to-analog conversion means; and
    counter means coupled to said digital memory means and to said digital control and timing generator, said counter means counting in response to clocking signals to provide addressing signals to said digital memory means to select information stored therein in accordance with a count of said counter means.

10. The apparatus as claimed in claim 9, wherein said signal input comprises:
    an analog input buss including a plurality of analog inputs, said analog input buss coupled to said signal input; and
    switching means coupled to said analog input buss and to said digital control and timing generator, said switching means for selecting a specified one of said plurality of analog inputs in response to control signals from said digital control and timing generator, said specified one of said plurality of analog inputs being coupled to said first comparator means and to said sampling and analog-to-digital conversion means by said switching means.

11. The apparatus as claimed in claim 9, wherein said sampling and analog-to-digital conversion means comprises:
    sample and hold means coupled to said signal input and to said digital control and timing generator, said sample and hold means for sampling said input signal to provide an analog pre-look signal at a pre-look signal output, said sample and hold means providing said analog pre-look signal in response to timing signals from said digital control and timing generator; and analog-to-digital conversion means coupled to said pre-look signal output and to said digital memory means, said analog-to-digital conversion means operating to provide said digital addressing signals in response to said analog pre-look signal.

12. The apparatus as claimed in claim 9, wherein said non-volatile memory means additionally provides said sensitivity time control data to said digital memory means in response to control signals from said digital control and timing generator.

13. The apparatus as claimed in claim 9, further comprising:

a latch coupled to said first comparator means and to said digital control and timing generator, said latch for measuring a temporal duration of said first detection signal.

14. The apparatus as claimed in claim 7, further comprising:

a filter coupled to said signal input for limiting a bandwidth of a present input signal having a first bandwidth $B_1$ to provide a limited bandwidth input signal having a second bandwidth $B_2$;

an attenuator coupled to said digital-to-analog conversion means to provide a second analog sensitivity time control signal having an attenuation $G_2$ from said first analog sensitivity time control signal, said first analog sensitivity time control signal having an attenuation $G_1$; and second comparator means coupled to said filter and to said digital memory means, said second comparator means having an input for receiving said second analog sensitivity time control signal, wherein said attenuations $G_1$ and $G_2$ of said first and second analog sensitivity time control signals and said first and second bandwidths B1 and B2 obey substantially the relation:

$$(B_1/B_2)^{0.5} = K(G_1/G_2),$$

wherein K is a constant having a value in the range from 0.1 to 10 and said second comparator means is for comparing said limited bandwidth input signal to said second analog sensitivity time control signal to provide a second detection signal.

15. An apparatus, comprising:

signal receiving means for providing one or more input signals, each of said one or more input signals having a bandwidth $B_n$;

a digital control and timing generator for providing control signals and clocking signals;

a sampler and analog-to-digital converter, said sampler and analog-to-digital converter coupled to said digital control and timing generator, said sampler and analog-to-digital converter for storing at least one of said one or more input signals in response to control signals from said digital control and timing generator, said sampler and analog-to-digital converter providing a digitized calibration signal;

a sensitivity time control generator for providing an analog calibration signal, said sensitivity time control generator coupled to said sampler and analog-to-digital converter; and one or more comparators coupled to said signal receiving means and having inputs each having an attenuator having an attenuation $G_1$ coupled to said analog calibration signal, each of said one or more comparators for comparing one of said one or more input signals to said analog calibration signal to provide a detection signal to a comparison signal output, said each of said one or more comparators and said each of said one or more input signals coupled to said sensitivity time control generator to provide a bandwidth-gain ratio for each of said one or more comparators substantially in accordance with:

$$(B_n)^{0.5}/G_n = K,$$

wherein K has a constant value in the range of between ten billion and one and wherein K has dimensions of square root Hertz.

16. The apparatus as claimed in claim 15, wherein said signal receiving means comprises:

an analog buss for conveying a plurality of analog signals; and an analog multiplexing switch coupled to said analog buss and to said digital control and timing generator, said analog multiplexing switch for selecting a given one or more of said plurality of analog signals as said one or more input signals in response to control signals from said digital control and timing generator.

17. The apparatus as claimed in claim 15, wherein said sampler and analog-to-digital converter comprises:

a sample and hold circuit coupled to said signal receiving means, said sample and hold circuit for sampling said one or more input signals and holding a value of said one or more input signals in response to control signals from said digital control and timing generator; and an analog-to-digital converter coupled to said sample and hold circuit, said analog-to-digital converter for converting said value of said one or more input signals to said digitized calibration signal.

18. The apparatus as claimed in claim 15, wherein said sensitivity time control generator comprises:

a digital memory coupled to said analog-to-digital converter, said digital memory for storing digital calibration data, said digital memory providing digital calibration data in response to said one or more input signals; and a digital-to-analog converter coupled to said digital memory, said digital-to-analog converter for converting said digital calibration data to said analog calibration signal.

19. The apparatus as claimed in claim 18, wherein said sensitivity time control generator further comprises a counter coupled to said digital memory, said counter counting in response to clocking signals from said digital control and timing generator and incrementally addressing said digital memory to access subsequent digital calibration data.

20. The apparatus claimed in claim 19, wherein said sensitivity time control generator further comprises a latch coupled to said counter and to said comparison signal output, said latch for measuring a temporal duration of said detection signal.

21. The apparatus claimed in claim 18, wherein said sensitivity time control generator further comprises a non-volatile memory coupled to said digital memory, said non-volatile memory for providing said digital memory with digital calibration data when commanded to by said digital control and timing generator.

* * * * *

UNITED STATES PATENT AND TRADEMARK OFFICE
CERTIFICATE OF CORRECTION

PATENT NO. : 5,221,928

DATED : June 22, 1993

INVENTOR(S) : Randy L. Dahl

It is certified that error appears in the above-identified patent and that said Letters Patent is hereby corrected as shown below:

Column 35, claim 15, line 67, change "$G_1$" to --$G_n$--.

Signed and Sealed this

Twelfth Day of April, 1994

BRUCE LEHMAN

*Attest:*

*Attesting Officer*

*Commissioner of Patents and Trademarks*